(12) United States Patent
Zhang et al.

(10) Patent No.: US 10,243,883 B2
(45) Date of Patent: Mar. 26, 2019

(54) EDGE DATAPATH USING USER-KERNEL TRANSPORTS

(71) Applicant: Nicira, Inc., Palo Alto, CA (US)

(72) Inventors: Ronghua Zhang, San Jose, CA (US); Yong Wang, Sunnyvale, CA (US); Teemu Koponen, San Francisco, CA (US); Michael Hu, San Francisco, CA (US); Xinhua Hong, Milpitas, CA (US)

(73) Assignee: NICIRA, INC., Palo Alto, CA (US)

( * ) Notice: Subject to any disclaimer, the term of this patent is extended or adjusted under 35 U.S.C. 154(b) by 93 days.

(21) Appl. No.: 14/965,270

(22) Filed: Dec. 10, 2015

(65) Prior Publication Data

US 2016/0226957 A1 Aug. 4, 2016

Related U.S. Application Data

(60) Provisional application No. 62/110,061, filed on Jan. 30, 2015.

(51) Int. Cl.
*G06F 15/173* (2006.01)
*H04L 12/947* (2013.01)
(Continued)

(52) U.S. Cl.
CPC .......... *H04L 49/25* (2013.01); *H04L 12/4633* (2013.01); *H04L 12/4654* (2013.01); *H04L 12/66* (2013.01); *H04L 41/0654* (2013.01); *H04L 41/145* (2013.01); *H04L 41/5041* (2013.01); *H04L 43/08* (2013.01); *H04L 43/106* (2013.01); *H04L 45/02* (2013.01);
(Continued)

(58) Field of Classification Search
CPC . H04L 12/4654; H04L 12/66; H04L 41/0654; H04L 41/145; H04L 43/08
See application file for complete search history.

(56) References Cited

U.S. PATENT DOCUMENTS

| | | | |
|---|---|---|---|
| 5,584,295 A | 12/1996 | Muller et al. | |
| 7,065,482 B2 * | 6/2006 | Shorey | .................... H04L 43/00 703/2 |

(Continued)

FOREIGN PATENT DOCUMENTS

| | | |
|---|---|---|
| WO | 2013/154813 A1 | 10/2013 |
| WO | 2017099900 A1 | 6/2017 |
| WO | 2017099901 A1 | 6/2017 |

OTHER PUBLICATIONS

Non-Published Commonly Owned International Patent Application PCT/US16/59615, filed Oct. 29, 2016, 61 pages, Nicira, Inc.
(Continued)

*Primary Examiner* — Tonia L Dollinger
*Assistant Examiner* — Dixon F Dabipi
(74) *Attorney, Agent, or Firm* — Adeli LLP

(57) ABSTRACT

A novel design of a gateway that handles traffic in and out of a network by using a datapath daemon is provided. The datapath daemon is a run-to-completion process that performs various data-plane packet-processing operations at the edge of the network. In some embodiments, the datapath daemon dispatches packets to other processes or processing threads outside of the daemon. In some embodiments, the datapath daemon dispatches packets to a kernel network stack in order to support packet traffic monitoring.

18 Claims, 20 Drawing Sheets

(51) Int. Cl.
| | |
|---|---|
| *H04L 29/08* | (2006.01) |
| *H04L 12/66* | (2006.01) |
| *H04L 12/26* | (2006.01) |
| *H04L 12/721* | (2013.01) |
| *H04L 12/935* | (2013.01) |
| *H04L 12/861* | (2013.01) |
| *H04L 12/741* | (2013.01) |
| *H04L 12/713* | (2013.01) |
| *H04L 12/931* | (2013.01) |
| *H04L 12/751* | (2013.01) |
| *H04L 12/717* | (2013.01) |
| *H04L 12/24* | (2006.01) |
| *H04L 12/733* | (2013.01) |
| *H04L 29/12* | (2006.01) |
| *H04L 12/801* | (2013.01) |
| *H04L 12/715* | (2013.01) |
| *H04L 12/46* | (2006.01) |
| *H04L 12/725* | (2013.01) |
| *H04L 12/747* | (2013.01) |
| *H04L 12/707* | (2013.01) |
| *H04L 12/703* | (2013.01) |

(52) U.S. Cl.
CPC .......... *H04L 45/122* (2013.01); *H04L 45/306* (2013.01); *H04L 45/42* (2013.01); *H04L 45/44* (2013.01); *H04L 45/586* (2013.01); *H04L 45/64* (2013.01); *H04L 45/72* (2013.01); *H04L 45/74* (2013.01); *H04L 45/742* (2013.01); *H04L 45/745* (2013.01); *H04L 47/19* (2013.01); *H04L 49/3009* (2013.01); *H04L 49/3063* (2013.01); *H04L 49/354* (2013.01); *H04L 49/9068* (2013.01); *H04L 61/2585* (2013.01); *H04L 67/1002* (2013.01); *H04L 67/1038* (2013.01); *H04L 67/2842* (2013.01); *H04L 67/327* (2013.01); *H04L 69/321* (2013.01); *H04L 69/326* (2013.01); *H04L 69/329* (2013.01); *H04L 41/5077* (2013.01); *H04L 45/22* (2013.01); *H04L 45/28* (2013.01); *H04L 45/38* (2013.01); *H04L 61/103* (2013.01); *H04L 61/2503* (2013.01); *H04L 61/6063* (2013.01); *H04L 67/1095* (2013.01); *H04L 2012/4629* (2013.01)

(56) References Cited

U.S. PATENT DOCUMENTS

| | | | | |
|---|---|---|---|---|
| 7,616,585 | B1 * | 11/2009 | Kritov | H04L 47/10 370/231 |
| 7,783,739 | B1 * | 8/2010 | Weigle | H04L 43/00 370/253 |
| 7,826,482 | B1 * | 11/2010 | Minei | H04L 45/24 370/395.5 |
| 7,996,631 | B1 * | 8/2011 | Bender | G06F 3/0617 709/203 |
| 9,154,433 | B2 * | 10/2015 | Koponen | G06F 9/45558 |
| 9,208,071 | B2 * | 12/2015 | Talagala | G06F 12/0246 |
| 9,641,435 | B1 | 5/2017 | Sivaramakrishnan | |
| 9,692,655 | B2 | 6/2017 | Koponen et al. | |
| 9,717,412 | B2 | 8/2017 | Roham et al. | |
| 2002/0145981 | A1 * | 10/2002 | Klinker | H04L 41/0816 370/244 |
| 2003/0231632 | A1 | 12/2003 | Haeberlen | |
| 2004/0073420 | A1 | 4/2004 | Lee et al. | |
| 2006/0059253 | A1 | 3/2006 | Goodman et al. | |
| 2008/0253396 | A1 * | 10/2008 | Olderdissen | H04L 1/1874 370/469 |
| 2009/0067440 | A1 | 3/2009 | Chadda et al. | |
| 2009/0216137 | A1 | 8/2009 | Holland | |
| 2010/0061226 | A1 * | 3/2010 | Morishige | H04L 12/66 370/216 |
| 2012/0120965 | A1 | 5/2012 | Khawer et al. | |
| 2013/0044641 | A1 * | 2/2013 | Koponen | H04L 12/66 370/255 |
| 2013/0103818 | A1 | 4/2013 | Koponen et al. | |
| 2013/0208728 | A1 | 8/2013 | Armstrong et al. | |
| 2013/0287026 | A1 | 10/2013 | Davie | |
| 2014/0050091 | A1 | 2/2014 | Biswas et al. | |
| 2014/0280892 | A1 | 9/2014 | Reynolds et al. | |
| 2014/0310417 | A1 | 10/2014 | Sorenson, III et al. | |
| 2014/0348161 | A1 | 11/2014 | Koponen et al. | |
| 2014/0379938 | A1 | 12/2014 | Bosch et al. | |
| 2015/0063366 | A1 | 3/2015 | Melander | |
| 2015/0078386 | A1 | 3/2015 | Jackson et al. | |
| 2015/0134822 | A1 | 5/2015 | Bhagwat et al. | |
| 2015/0271303 | A1 | 9/2015 | Neginhal et al. | |
| 2015/0365330 | A1 | 12/2015 | Pandey et al. | |
| 2016/0094460 | A1 * | 3/2016 | Shelar | H04L 45/56 370/392 |
| 2016/0226958 | A1 | 8/2016 | Zhang et al. | |
| 2016/0226959 | A1 | 8/2016 | Zhang et al. | |
| 2016/0226960 | A1 | 8/2016 | Zhang et al. | |
| 2016/0226961 | A1 | 8/2016 | Zhang et al. | |
| 2016/0226967 | A1 | 8/2016 | Zhang et al. | |

OTHER PUBLICATIONS

PCT International Search Report and Written Opinion for commonly owned International Patent Application PCT/US16/59615, dated Feb. 3, 2017, 13 pages, Nicira, Inc.

\* cited by examiner

Option 1 for inserting service stages

Option 2 for inserting service stages

EDGE DATAPATH USING USER-KERNEL TRANSPORTS

CLAIM OF BENEFIT TO PRIOR APPLICATIONS

The present application claims the benefit of U.S. Provisional Patent Application 62/110,061, filed Jan. 30, 2015. U.S. Provisional Patent Application 62/110,061 is incorporated herein by reference.

BACKGROUND

A gateway is a network point that acts as an entrance to another network. In a network provided by a datacenter, a computing resource assigned to be a gateway node facilitates and regulates traffic between the datacenter network and an external physical network. The gateway is typically is associated with a router, which knows where to direct a given packet of data that arrives at the gateway, and a switch, which furnishes the actual path in and out of the gateway for a given packet. The gateway is also a compute node that provides various network traffic services, such as firewall, network address translation (NAT), security protocols (such as HTTP over SSL), etc. As datacenters become larger and provide ever more computing and networking resources, gateways also have to handle more traffic. In other words, the gateways and their associated routers and switches have to perform more switching, routing, and service tasks at greater speed.

SUMMARY

Some embodiments provide a gateway machine that handles traffic in and out of a network by implementing a datapath daemon. The datapath daemon is a run-to-completion process that performs various data-plane packet-processing operations at the edge of the network. In some embodiments, the datapath daemon dispatches packets to other processes or processing threads outside of the daemon.

Some embodiments offload workload from one or more of the datapath stages from the datapath daemon to processes or threads that are external to the datapath daemon. Such processes can be performed by the same processing core that performs the datapath daemon, by a different processing core as the core that performs the datapath daemon, or by multiple processing cores. In some embodiments, gateway is operating an operating system such as Linux that divides memory space into user space and kernel space. The datapath daemon in some of these embodiments is a process operating in the user space. The user space datapath daemon dispatches packet to processes operating in the kernel space or to other processes operating in the user space in some embodiments.

In some embodiments, the datapath daemon copies packets to processes or threads outside of the datapath daemon. This packet copying operation is analogous to operations of a Switched Port Analyzer (SPAN), which mirrors packet to a port for monitoring purposes. In some embodiments, such packet replication occurs when the datapath daemon is at a particular point or stage of the datapath pipeline when processing an incoming packet. In other words, the datapath daemon mirrors packets out of the daemon before or after certain packet processing operations.

In some embodiments, the datapath daemon of an edge gateway offloads workload by performing one or more of its stages or operations by using processes or processing threads that are external the datapath daemon. In some of these embodiments, the datapath daemon dispatches packets to those external processes at certain points of the datapath daemon. In some embodiments, the datapath daemon uses the result of the external process to execute subsequent pipeline stages. In some embodiments, a gateway datapath daemon includes a L7 load balancing stage (application layer load balancer) that dispatches packet to an external process or daemon to handle the load balancing tasks before returning a resulting packet to the datapath daemon to continue subsequent stages.

In some embodiments, both the datapath daemon and the external process are user space processes, and the inter-process transport for sending packets from the datapath daemon to the external process are shared memory structures such as ring buffers. In some embodiments, the datapath daemon is a user space process while the external process is either a kernel space process or a user space process that communicates with the datapath daemon through kernel space process or processing thread such as a network stack (e.g., TCP/IP stack.) In some of these embodiments, datapath daemon uses user-kernel data transport mechanism such as KNI (Kernel NIC Interface) or TUN/TAP virtual network kernel devices to deliver packets between the user space datapath daemon and the external process.

In some embodiments, the operating system of the gateway machine provides a network protocol stack as a processing thread in its kernel space. Such a network stack is normally used to handle network protocols for packets at a NIC (Network Interface Controller) of the gateway machine. Rather than implementing another network protocol stack in the user space, some embodiments leverages the existing kernel network stack to perform various operations. In some embodiments, the datapath daemon sends mirrored packets to the network stack through user-kernel transport (such as KNI), which is treated as a NIC by the kernel network stack. Once the packet reaches the kernel network stack, the gateway machine is able to utilize the functionalities of the kernel stack as if the datapath packet is directly provided by the physical NIC.

In some embodiments, the datapath daemon mirrors packet to the network stack so a user of the gateway would be able to use tcpdump command to view packets flowing through various logical entities or logical ports of the datapath. In some embodiments, the DP configuration database of the datapath daemon specifies from which logical ports or from which logical entities should the packets be mirrored to the kernel network stack. These packets are then in turn available for analysis by tools such as tcpdump.

Some embodiments dispatch packets from the datapath daemon to other user space processes. In some embodiments, these user space processes are for processing control plane packets of the network such as BGP packets. These packets are not to be forwarded in the data plane, but are instead consumed by control plane processes. The datapath daemon in some embodiments dispatches these control plane packets to their corresponding control plane processes. Specifically, the packets are dispatched to the network stack from the datapath daemon through user-kernel transport, and the network stack in turn delivers the packet to its corresponding control plane process. In some embodiments, a control plane packet (such as BGP packet) has identifiers that are recognizable by the network stack that can be used to deliver the packet to the corresponding control plane user process.

In some embodiments, the control plane process is regarded as being performed by a logical entity in the logical network, specifically in the service router. In some embodiments, the datapath has a dispatch stage that corresponds to the control plane process. In some embodiments, such a stage is for determining whether the packet is for the control plane process or not. For example, in some embodiments, the datapath's service router includes a BGP dispatch stage for determining whether the incoming packet is a BGP packet. If so, the datapath daemon terminates processing of the packet and let the BGP process consumes the BGP packet and performs the corresponding BGP operations.

In some embodiments, not all datapath tasks are performed by the datapath daemon. Specifically, the datapath daemon in some embodiments exports packets (by dispatching packets to kernel network stack through user-kernel transport) to an external data plane process for some of the datapath stages. In some embodiments, the external data plane process would transport the processed packet back to the datapath daemon to continue datapath processing.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a gateway machine that handles traffic in and out of a network by implementing a datapath daemon. The datapath daemon is a run-to-completion process that performs various data-plane packet-processing operations at the edge of the network. In some embodiments, the datapath daemon dispatches packets to other processes or processing threads outside of the daemon.

Several more detailed embodiments of the invention are described below. Section I describes a datapath daemon at an edge gateway of a network. Section II describes a datapath daemon that dispatches packets to processes outside of the daemon. Section III describes datapath operations that leverage the existing network stack in the kernel. Section IV describes a software architecture of a gateway that implements the datapath pipeline. Section V describes a computing device operating virtualization software. Finally, section VI describes an electronic system with which some embodiments of the invention are implemented.

I. Data Path Daemon at Edge Gateway

Figure 1:
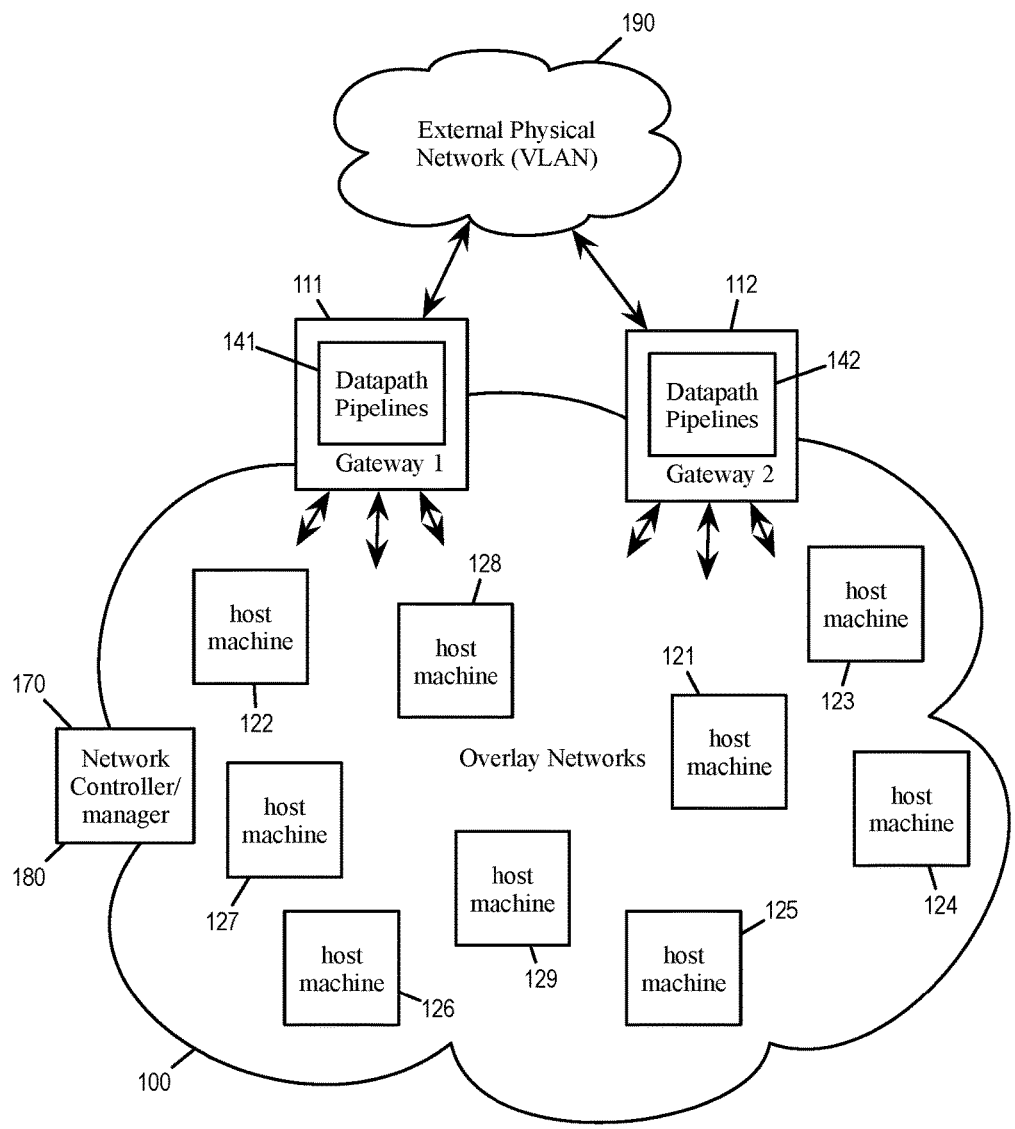
FIG. 1 conceptually illustrates a data center whose traffic to and from an external network goes through gateways.

FIG. 1 conceptually illustrates a data center 100 whose traffic to and from an external network 190 goes through gateways 111-112. Each of the gateways operates a datapath pipeline (141 and 142 respectively) for processing packets that go through the gateway.

The datacenter 100 includes various other computing and networking resources 121-129 that are interlinked by a provider network. These resources communicate with each other through the provider network and with the external network 190 by network traffic over physical communication mediums (which can include wired communications such as Ethernet or wireless communications such as WiFi). Packets from the computing and networking resources 121-129 can reach the external network 190 through one of the gateways 111-112, and packets from the external network 190 can reach the computing and network resources 121-129 through one of the gateways 111-112. A gateway of a network is therefore regarded as being at the edge of the network and therefore also referred to as an edge device or edge node.

In some embodiments, some of these resources are provided by computing devices serving as host machines 121-129. Some of these host machines operate virtualization software, which allow these host machines to host various virtual machines (VMs). A host machine running virtualization software will be described in greater detail by reference to FIG. 20 below. In some embodiments, a gateway is itself a host machine, and datapath pipeline (141 or 142) of the gateway is provided by one of the VMs running on its virtualization software. Some of these resources are running as "bare metal", i.e., without virtualization software. In some embodiments, the gateway is a bare metal computing device that operates its datapath pipeline directly over its own operating system without virtualization software.

In some embodiments, the packet traffic within the datacenter is conducted by using overlay logical networks such as Virtual eXtensible LAN (VXLAN), Generic Network Virtualization Encapsulation (GENEVE), and Network Virtualization using Generic Routing Encapsulation (NVGRE). VXLAN. In some of these embodiments, each of the host machines and the gateway machines is a VXLAN endpoint (referred to as VTEP) that transmits packets using overlay encapsulation. In some embodiments, the external physical network is conducted by VLAN, and the gateways relay the traffic between the datacenter and the external network by translating VXLAN packets to VLAN packets and vice versa.

In some embodiments, the computing and networking resources of the datacenter implement one or more logical networks, each logical network having access to the gateways 111-112 for traffic to and from the external network 190. In some embodiments, each logical network has its own set of logical routers and logical switches for conducting network traffic of the logical network. Some or all of these logical routers and switches are provided by software operating in the host machines (either as virtualization software or as programs executing on bare metal host machines). In some embodiments, some of the logical routers and switches operate in the gateways 111-112 as stages in their respective datapath pipelines 141-142.

In some embodiments, the datacenter 100 includes a network manager 180 for provisioning/creating the logical networks in the data center 100 and a network controller 170 (or a cluster of controller) for controlling the various logical routers and switches (including those operating in the gateways 111-112) of the various logical networks. Logical routers and switches are described in U.S. patent application Ser. No. 14/814,473, titled "Logical Router with Multiple Routing Components" and filed on Jun. 30, 2015, and is now issued a U.S. Pat. No. 9,787,605, which is incorporated herein by reference.

The control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) to a set of physical machines using a set of logical forwarding elements (e.g., logical L2 and L3 switches). In some embodiments, different subsets of end machines reside on different host machines that execute managed forwarding elements (MFEs), also known as virtualization software or hypervisors. The MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

Figure 2:
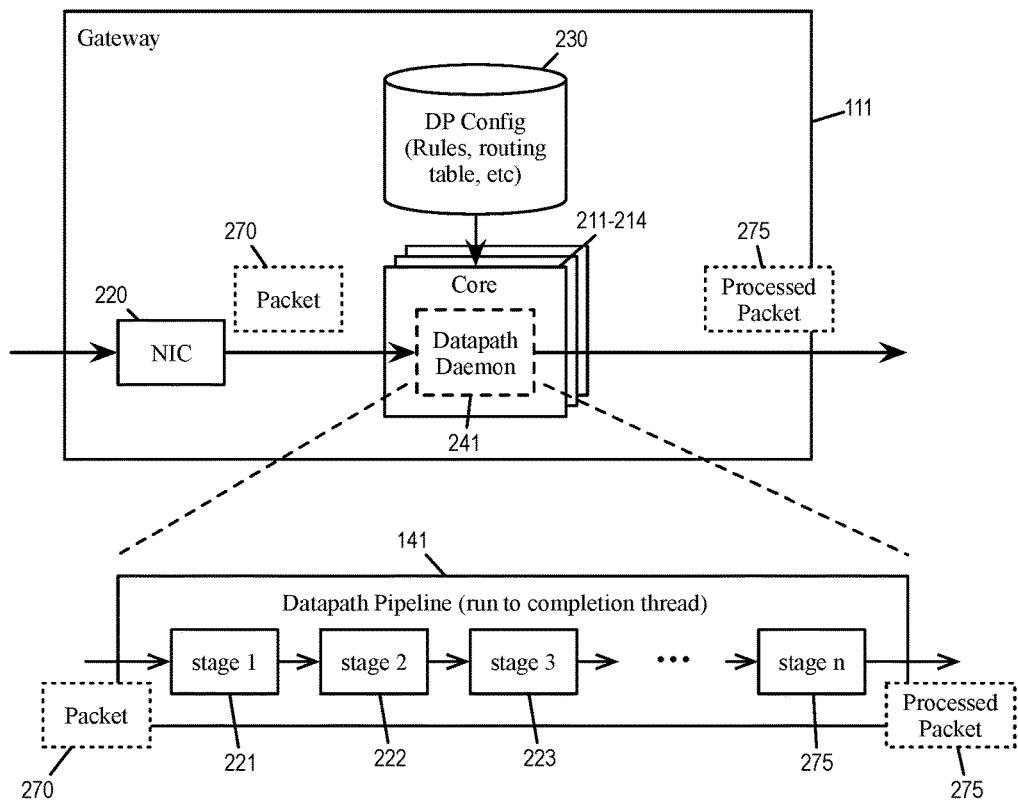
FIG. 2 illustrates a gateway machine implementing a datapath pipeline in greater detail.

FIG. 2 illustrates a gateway machine implementing a datapath pipeline in greater detail. As illustrated, the gateway 111 comprises processing cores 211-214 and a network interface controller (NIC) 220. The NIC 220 receives data packets from the network communication medium that connects the gateway 111 and provide the received packets to the cores 211-214 for processing.

Each of the processing cores is operating one or more processing threads. Specifically, the core 211 is operating the datapath pipeline 141 as a processing thread that is referred to as a datapath daemon 241. As illustrated, the datapath daemon 241 receives a packet 270 and processes the packet 270 through a series of stages 221-229 to produce a processed packet 275. In some embodiments, each core performs only one thread at a time, and each thread processes one packet at a time. In other words, each packet processing thread is a run-to-completion (RTC) thread that does not start to process another packet until it has completed processing the current packet (i.e. 270) through all of its stages 221-229.

The operations of the datapath daemon 241 is defined or specified by a data path configuration database storage (DP configuration database) 230. The configuration data stored in DP configuration database 230 specifies what functions or operations each stage of the pipeline should perform with regard to each incoming packet. For some stages that correspond to logical routers or switches, the DP configuration database in some embodiments provide content for routing tables or forwarding tables that specify next hops. For some stages that correspond to network services such as firewall, the DP configuration database 230 provides service rules. In some embodiments, the network controller 170 (or the network manager 180) loads and updates the content of DP configuration database 230.

In some embodiments, the sequence of the stages that are to be executed as part of the datapath pipeline is dynamically determined according to the content of the received packet. In the context of FIG. 2, this means that the content of the packet 270 dynamically determines what processing stages are to be performed as part of the datapath pipeline 141. In some embodiments, the core 211 when processing/parsing the packet at a particular stage determines or identifies the next stage that is to be used for processing the packet. In some embodiments, each stage of the datapath pipeline corresponds to a packet-processing logical entity such as logical router or logical switch, and the next stage identified by the packet processing at the stage corresponds to the next hop of the packet in the logical network, the next hop being another packet-processing logical entity. (A packet-forwarding logical entity will be referred to as a logical entity throughout this document for simplicity).

In some embodiments, a pipeline stage that corresponds to a logical router or a logical switch is a complete functional model of the logical router or switch, i.e., it specifies all of its logical ports, its routing/forwarding tables, the services it provides, its security policies, its encapsulation protocols, etc. In some embodiments, all of these features of the logical routers are specified by a package of computer executable code and can be performed as a pipeline stage by a function call. It performs forwarding either by destination MAC (L2 switching) or destination IP (L3 routing). Such a pipeline stage is therefore distinguishable from a flow table under OpenFlow or Open vSwitch, which performs flow forwarding according to a set of flow entries, each entry describing a match condition and a corresponding action.

In some embodiments, the packet processing operations of each logical entity (i.e., pipeline stage) is based on the configuration data stored in the DP configuration database for that logical entity. Such configuration data also defines the criteria or the rules for identifying the next hop of the packet. In some embodiments, such next hop identifying rules are stored in the DP configuration database as routing tables or forwarding tables associated with the stage. Such next hop identifying rules in some embodiments allow the datapath daemon to determine the identity of the next hop by examining the content of the packet (e.g., its source and destination addresses) and/or by noting the logical port through which the packet enters the logical entity. In other words, the DP configuration database can be regarded as storing the logical relationship between the various hops of a logical network, and the datapath daemon processes each packet by traversing the logical network according to those logical relationships and the content of the packet.

Figure 3:
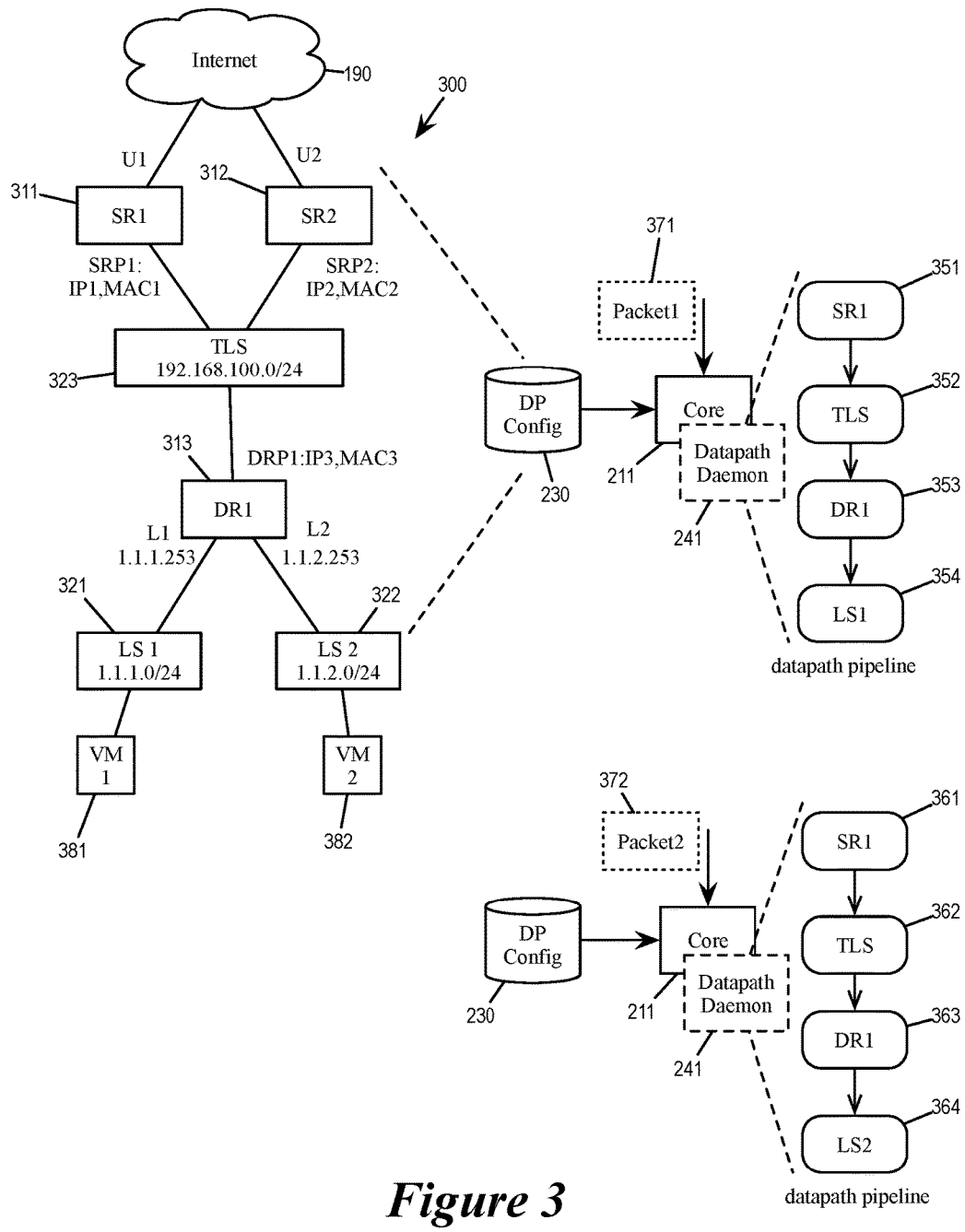
FIG. 3 illustrates the dynamic identification of processing stages by a datapath daemon.

FIG. 3 illustrates the dynamic identification of processing stages by a datapath daemon. As illustrated, the core 211 is operating the datapath daemon 241 as a processing thread. The datapath daemon 241 is processing a packet 371 according to a logical network 300, whose configuration data is stored in the DP configuration database 230.

As illustrated, the logical network 300 includes service routers 311 and 312 (SR1 and SR2), logical switches 321, 322, and 323 (LS1, LS2, and TLS), and distributed router 313 (DR). Each of the service routers SR1 and SR2 has an uplink (U1 and U2) for connecting to the external network 190. The logical switch TLS 323 is a transit logic switch that provides L2 switching for packets from routers SR1 311, SR2 312, and DR1 313, which are assigned logical ports with MAC address "MAC1", "MAC2", and "MAC3" respectively. The distributed router DR1 313 on the other hand provides L3 routing among L2 network segments defined by the logical switches LS1 321, LS2 322, and TLS 323.

The figure illustrates how the datapath daemon 241 processes two different packets 371 and 372 according to the configuration data stored in the DP configuration database 230. The two different packets cause the datapath daemon 241 to traverse the logical network 300 differently and to execute different corresponding pipeline stages.

The packet 371 is a packet from the external network 190 that is destined for a VM 381 (VM1) behind the L2 segment of the logical switch LS1. The processing core 211 upon receiving the packet 371 performs a packet processing stage 351 that corresponds to the service router SR1 311. The operations of the stage 351 are defined by the configuration in the DP configuration database. The service router SR1 311 logically forwards the packet to the logical switch TLS 323, which causes the datapath daemon 241 to identify a next packet processing stage 352 that corresponds to the logical switch TLS 323.

The processing stage 352 is configured by DP configuration database 230 to perform L2 switching operations as the logical switch TLS 323, which forwards the packet 371 from its "MAC1" port to its "MAC3" port. The MAC3 port correspond to the distributed router DR1, and the datapath daemon 241 correspondingly identifies a next packet processing stage 353 that corresponds to DR1 313.

The processing stage 353 is configured by the DP configuration database 230 to perform L3 routing operations as the distributed logical router DR1 313, which operates according to a routing table provided by the DP configuration database 230. According to the routing table and the destination IP address of the packet 371, the logical router DR1 routes the packet 371 from the L2 segment defined by the logical switch TLS 323 to an L2 segment defined by the logical switch LS1 321. Correspondingly, the datapath daemon 241 identifies a next packet processing stage 354 that corresponds to LS1 321.

The processing stage 354 is configured by DP configuration database 230 to perform L2 switching operations as the logical switch LS1 321, which forwards the packet 371 toward the virtual machine VM1 (381) according to the packet's destination MAC address.

The packet 372 is destined for a VM 382 that is attached to a L2 segment defined by the logical switch LS2. The packet 372 causes the datapath daemon 241 to identify a packet processing stage 361 to perform the service router SR1, then identify a packet processing stage 362 to perform the logical switch TLS 323, then identify a packet process stage 363 to perform the distributed router DR 313. When processing the packet 372, the packet processing stage 363 routes the packet from the L2 segment defined by the logical switch TLS 323 to an L2 segment defined by the logical switch LS2 322. Correspondingly, the datapath daemon 241 identifies a next packet processing stage 364 that corresponds to the logical switch LS2 322, which forwards the packet 372 toward the virtual machine VM2 (382) according to the packet's destination MAC address.

In the example of FIG. 3, though the datapath daemon 241 operate according to the same DP configuration database 230, the two different packets 371 and 372 causes the datapath daemon to traverse the logical network 300 differently and performed different packet processing stages (SR1-TLS-DR1-LS1 for the packet 371, SR1-TLS-DR1-LS2 for the packet 372).

In some embodiments, each packet processing stage is implemented as a function call for the datapath daemon thread. In some embodiments, a function (also known as a subroutine or a procedure) is a sequence of program instructions that are packaged as unit to perform a specific task. In some embodiments, the function being called to implement the various stages of the datapath is part of the programming of the datapath daemon operating at the core, but the called function performs different operations based on different configuration data for different network identities. In other words, the programming of the core provides functions that can be called by the datapath daemon to perform the functions of the various logical routers, logical switches, and service providing entities.

The function call uses the content of the packet as an input argument. In some embodiments, the function call also uses the identity of the logical port through which the packet enters the corresponding logical entity as an input argument. In some embodiments, the function call also identifies an egress port, which is used to identify the ingress port of the next function call for the next pipeline stage.

In some embodiments, some of the logical entities/elements of a logical network are distributed among multiple physical machines in the datacenter, i.e., each of these host machines has a copy or instance of the distributed logical entity. A packet requiring processing by a distributed logical entity can be processed by any machine that is running an instance of the distributed logical entity. On the other hand, some of the logical entities/entities are not distributed but are instead centralized or concentrated on one physical machine, i.e., the logical entity has only one physical instance. Such a centralized routers acts as centralized point for routing packets between logical network and external routers in some embodiments. A packet requiring processing by a centralized logical entity has to be forwarded to the machine that is operating the centralized logical entity. Distributed logical routers and centralized logical routers are described in U.S. patent application Ser. No. 14/814,473, titled "Logical Router with Multiple Routing Components" and filed on Jun. 30, 2015.

A datapath daemon in some embodiments when processing an incoming packet would execute both distributed logical entities and centralized logical entities as its pipeline stages. In some embodiments, service routers (SRs) are centralized logical routers. Each service router has only one instance running on one gateway machine. A datapath daemon running on a gateway machine would therefore invoke the service router that is centralized or concentrated on the gateway machine as one of its datapath pipeline stages.

In some embodiments, the configuration data (DP configuration database) that controls the operation of a service router stage includes definitions of any services the logical router should provide, whether the logical router will be configured in active-active or active-standby mode, how many uplinks are configured for the logical router, the IP and MAC addresses of the uplinks, the L2 and L3 connectivity of the uplinks, the subnets of any southbound interfaces of the logical router, any static routes for the routing information base (RIB) of the logical router, as well as other data.

Figure 4:
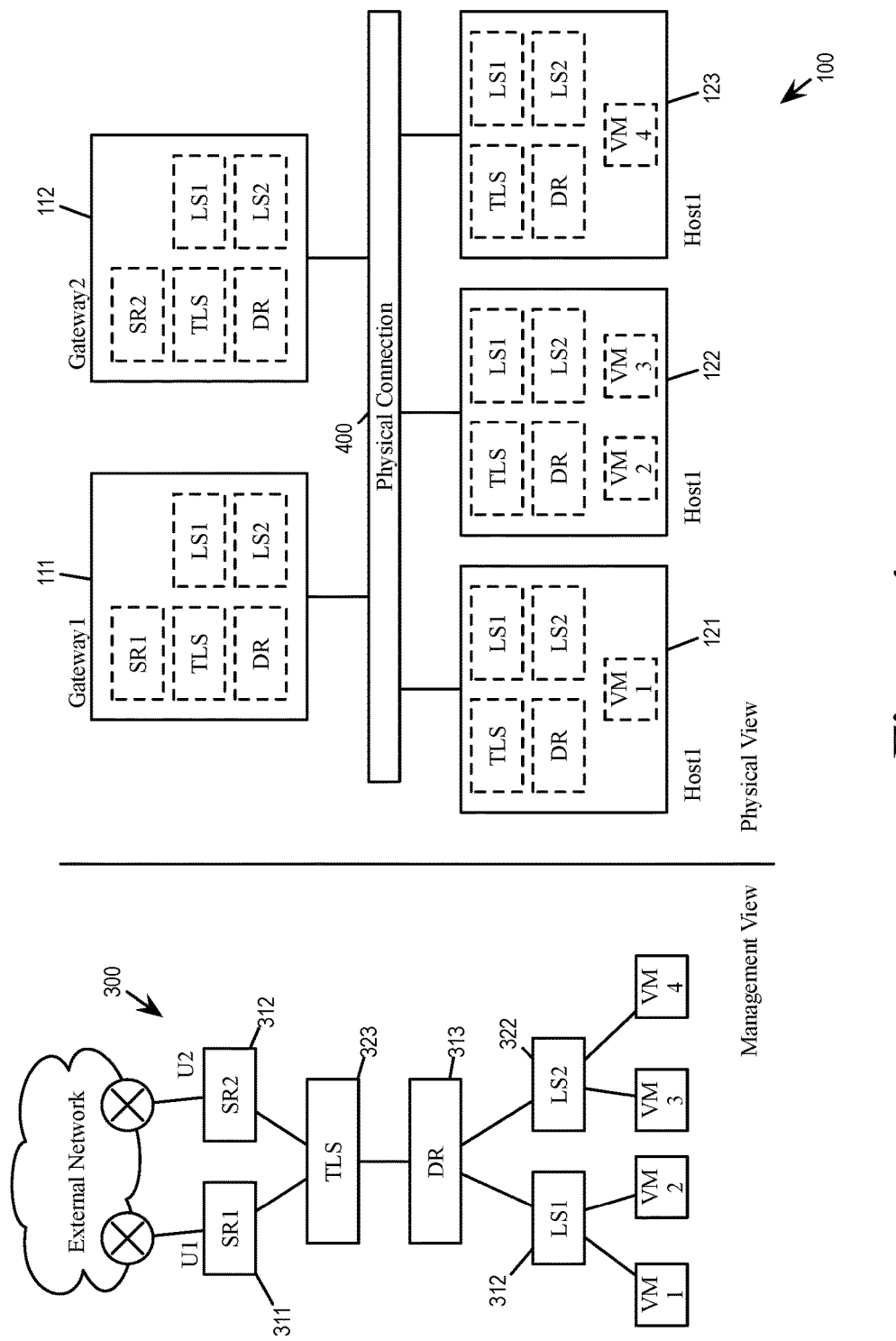
FIG. 4 illustrates a logical network with both distributed and centralized logical entities.

FIG. 4 illustrates a logical network with both distributed and centralized logical entities. Specifically, the figure illustrates a logical view and a physical view of the logical network 300. The logical view of the logical network 300 shows the logical relationship and connection between the various logical entities of the network. The physical view of the logical network 300 shows the physical instantiation of the various logical entities in the physical host machines and the physical gateways of the datacenter.

According to the logical view, the logical network 300 includes service routers 311 and 312 (SR1 and SR2), logical switches 321, 322, and 323 (LS1, LS2, and TLS), and distributed router 313 (DR). Among these logical entities, the service routers SR1 and SR2 are centralized logical entities, while LS1, LS2, TLS and DR are distributed logical entities.

Some embodiments provide a distributed logical router implementation that enables first-hop routing in a distributed fashion (rather than concentrating all of the routing functionality at the gateways). In the physical realization, the logical router of some embodiments includes a single distributed routing component (also referred to as a distributed router or a DR) and one or more service routing components (also referred to as service routers or SRs). The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound as well as one or more physical routers that are capable of performing routing operations. The DR of some embodiments is responsible for first-hop distributed routing between logical switches and/or other logical routers that are logically connected to the logical router. The service routers (SRs) span only the edge nodes of the logical networks and are responsible for delivering services that are not implemented in a distributed fashion (e.g., some stateful services).

The physical view of the network shows the physical instantiation of these centralized and distributed logical entities in the actual physical machines of the datacenter 100. As illustrated, the datacenter 100 includes gateways 111-112 and host machines 121-123 that are interconnected by physical connection 400. The instances of the distribute elements TLS, LS1, LS2, and DR are distributed across the gateways 111-112 and the host machines 121-123. In some embodiments, different physical instances of a distributed element operate according to a same set of forwarding tables. However, the centralized element SR1 is active only in the gateway 111 while the centralized element SR2 is active only in gateway 112. In other words, only the datapath daemon of gateway 111 executes SR1 as a pipeline stage and only the datapath daemon of gateway 112 executes SR2 as a pipeline stage.

II. Datapath and External Processes

As mentioned, though a datapath daemon is a run-to-completion thread of a processor core, some embodiments offload workload from one or more of the datapath stages from the datapath daemon to processes or threads that are external to the datapath daemon. Such processes can be performed by the same processing core that performs the datapath daemon, by a different processing core as the core that performs the datapath daemon, or by multiple processing cores. In some embodiments, the gateway is operating an operating system such as Linux that divides memory space into user space and kernel space. In some embodiments, the kernel space is reserved for running a privileged operating system kernel, kernel extensions, and most device drivers. In contrast, user space is a memory area where application software and some device drivers execute. The datapath daemon in some of these embodiments is a process operating in the user space. The user space datapath daemon dispatches packet to processes operating in the kernel space or to other processes operating in the user space in some embodiments.

In some embodiments, the datapath daemon copies packets to processes or threads outside of the datapath daemon. This packet copying operation is analogous to operations of a Switched Port Analyzer (SPAN), which mirrors packet to a port for monitoring purposes. In some embodiments, such packet replication occurs when the datapath daemon is at a particular point or stage of the datapath pipeline when processing an incoming packet. In other words, the datapath daemon mirrors packets out of the daemon before or after certain packet processing operations.

Figure 5:
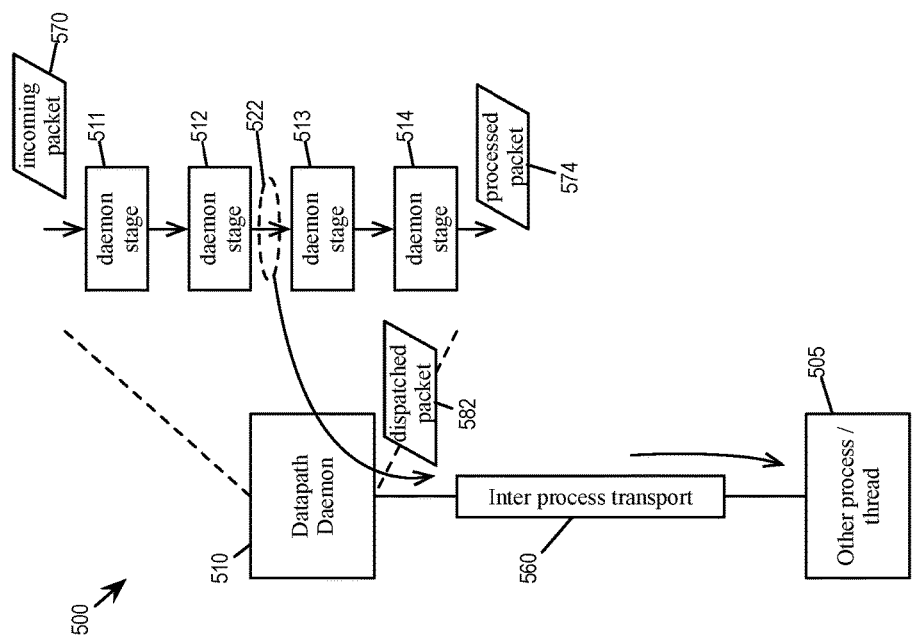
FIG. 5 illustrates a datapath daemon mirroring packets to an external process.

FIG. 5 illustrates a datapath daemon 510 mirroring packets to an external process. As illustrated, the datapath daemon 510 of a gateway machine 500 is processing an incoming packet 570 by executing pipeline stages that includes stages 511-514. Each of the daemon stages 511-514 performs certain operations such as L2 switching, L3 routing, firewall, load balancer, NAT, etc. on the incoming packets 570. Some of the stages alter the content of the packet (e.g., such as inserting VLAN tags or changing source/destination addresses). As illustrated, following the daemon stage 514, the datapath daemon produces a processed packet 574 that is the result of processing the incoming packet 570 after daemon stages 511-514.

The datapath daemon 510 also mirrors packets at a mirroring point 522 of the datapath. The mirroring point 522 is after the daemon stage 512 and before the daemon stage 513. As illustrated, the datapath daemon produces a packet 572 at the point 522, the packet 572 is the processed packet produced by the daemon stage 512. The packet 572 then continues onto stage 513 and 514 and becomes processed packet 574. The datapath daemon also copies the packet 572 to create a mirrored packet 582 at the point 522. The datapath daemon dispatches the mirrored packet 582 to another process 505 that is external to the datapath daemon 510. The dispatched packet 582 reaches the other process 505 through an inter-process transport 560.

In some embodiments, the datapath daemon of an edge gateway offloads workload by performing one or more of its stages or operations by using processes or processing threads that are external the datapath daemon. In some of these embodiments, the datapath daemon dispatches packets to those external processes at certain points of the datapath daemon. In some embodiments, the datapath daemon uses the result of the external process to execute subsequent pipeline stages. For example, in some embodiments, a gateway datapath daemon includes a L7 load balancing stage (application layer load balancer) that dispatches packet to an external process or daemon to handle the load balancing tasks before returning a resulting packet to the datapath daemon to continue subsequent stages.

Figure 6:
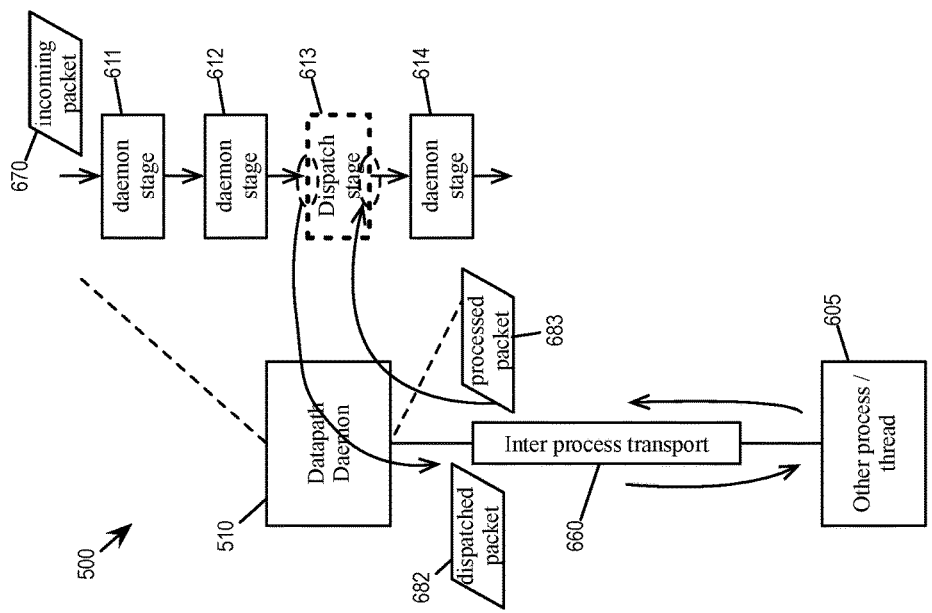
FIG. 6 illustrates a datapath daemon performing one of its stages by using an external process (or external daemon).

FIG. 6 illustrates the datapath daemon 510 performing one of its stages by using an external process (or external daemon) 605. As illustrated, the datapath daemon 510 is executing pipeline stages 611-614 for processing a packet 670. The stages 611, 612, and 614 are daemon stages that are handled by the datapath daemon. The stage 613 is a dispatch stage during which the datapath daemon 510 dispatches (or exports) a packet 682 to the external process 605 through an inter-process transport 660. The dispatched packet 682 is a packet from an output of the stage 612. The external process 605 processes the packet 682 and produces a processed packet 683, which is returned to the datapath daemon 510 through the inter-process transport 660 (or through another inter-process transport). The datapath daemon 510 uses the returned data 683 to continue execution of the datapath pipeline at the subsequent stage 614.

Though FIG. 6 illustrates a datapath daemon executing only one stage that relies on an external process, one of ordinary skill would understand that in some embodiments, there can be multiple stages in the datapath that dispatches packet to external processes or daemons for processing. For example, in some embodiments, a datapath daemon can have one stage for dispatching packets to an external L7LB processing daemon, and another stage for dispatching packets to an external HTTPS processing daemon.

Figures 7A, 7B:
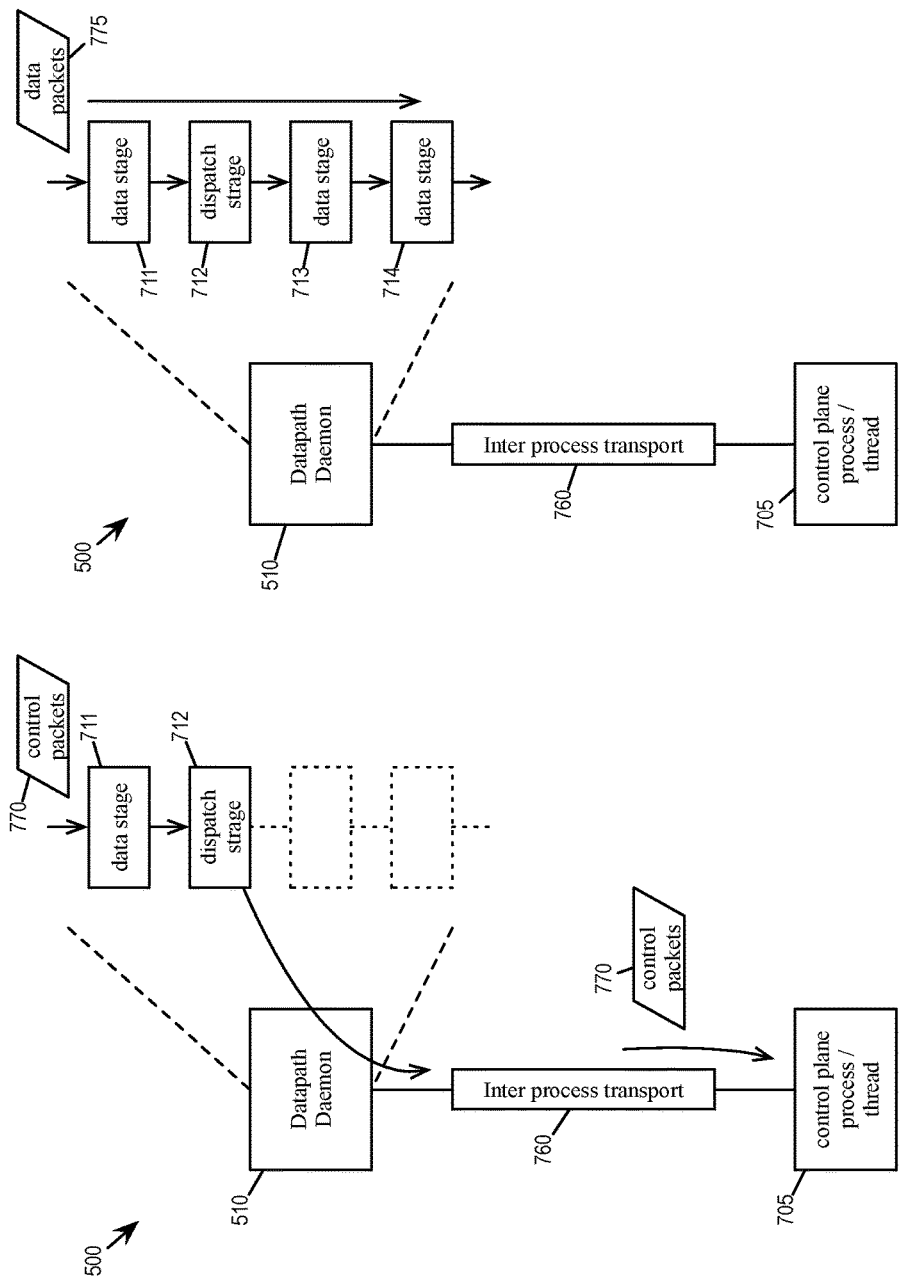
FIGS. 7a-b illustrates a datapath daemon handling an incoming packet that is destined for the control plane by dispatching the control plane packet to a control plane process.

In some embodiments, an incoming packet is a control plane packet (e.g., containing route information exchange under BGP or Border Gateway Protocol) that is destined for the control plane of the network. In some embodiments, the datapath daemon does not process the packet (as it is not a data plane packet), but rather forward it to an external control plane process, which consumes the packet. FIGS. 7a-b illustrate the datapath daemon 510 handling an incoming packet that is destined for the control plane by dispatching the control plane packet to a control plane process 705.

As illustrated, the datapath daemon 510 receives a control plane packet 770 (from e.g., an external physical router) and performs stages 711 and 712. After the datapath daemon performs some preliminary processing operations at the stage 711, it dispatches the control plane packet 770 to the control plane process 705 through an inter-process transport 760. The control plane process 705 in turn consumes the packet (by e.g., storing and distributing BGP routing information.). In some embodiments, the inter-process transport forwards the mirror packet from the datapath to a network stack process initially, and the network stack process in turn forwards the mirrored packet to the control plane process. Section III.B below further discusses the handling of control plane traffic by packet dispatch from the datapath daemon.

In some embodiments, the datapath daemon determines at one of its stages whether the packet is destined for a particular control plane process. In the example of FIG. 7a, the datapath daemon makes this determination at the dispatch stage 712. In some embodiments, such a dispatch stage is a dispatching step based on packet parsing and matching rather than an actual processing stage (as the actual processing of the stage is performed by external control plane process 705). If the packet is a packet of the particular control plane process, the daemon dispatches the packet to the control plane process 705 as illustrated in FIG. 7a. If not, the datapath daemon proceeds to perform subsequent datapath pipeline stages 713 and 714 as illustrated in FIG. 7b. In the example of FIG. 7b, the datapath daemon 510 receives another packet 775, which datapath daemon 510 determines at the dispatch stage 712 not to be a packet for the control plane process 705. Consequently, the datapath daemon does not dispatch a packet at the stage 712 but proceeds to perform stages 713 and 714.

As mentioned, in some embodiments, the gateway is operating an operating system that divides memory space into user space and kernel space. In some embodiments, both the datapath daemon and the external process are user space processes, and the inter-process transport (550 or 750) needed for sending packets from the datapath daemon to the external process are simply shared memory structures such as rings buffers in the user space. In some embodiments, the datapath daemon is a user space process while the external process is either a kernel space process or a user space process that communicates with the datapath daemon through kernel space process or processing thread such as a network protocol stack (e.g., TCP/IP stack.) In some of these embodiments, datapath daemon uses user-kernel data transport mechanism such as KNI (Kernel NIC Interface) or TUN/TAP virtual network kernel devices to transport packets between the user space datapath daemon and the external process (e.g., through the kernel network stack).

A network stack, or a protocol stack is an implementation of a computer networking protocol suite. It is therefore also referred to as a TCP (Transmission Control Protocol) stack. In some embodiments, the operating system (such as Linux) of the gateway machine provides a network stack as a processing thread that operates in the kernel space. In a machine that does not implement the datapath daemon of the current invention, the network stack is responsible handling the network protocols of packets being received and transmitted by a NIC. In some embodiments that do implement a datapath daemon, the network stack handles packets from the datapath daemon through a user-kernel transport (e.g., KNI) as if the transport is a NIC.

TUN and TAP are virtual network kernel devices that are backed up by hardware network adapters. TUN simulates a network layer device and it operates with layer 3 packets like IP packets. TAP simulates a link layer device and it operates with layer 2 packets like Ethernet frames. Packets sent by an operating system via a TUN/TAP device are delivered to a user space program that attaches itself to the device. A user-space program may also pass packet into a TUN/TAP device. In this case the TUN/TAP device delivers or injects these packets to the operating system network stack (TCP/IP stack) thus emulating their reception from an external source.

KNI is provided by DPDK® (Data Path Development Kit) in order to allow user space applications access to the Linux kernel. It allows management of DPDK ports using standard Linux net tools such as ethtool, ifconfig, and tcpdump. It also functions as a NIC for receiving and transmitting packets for the kernel network stack.

Figure 8:
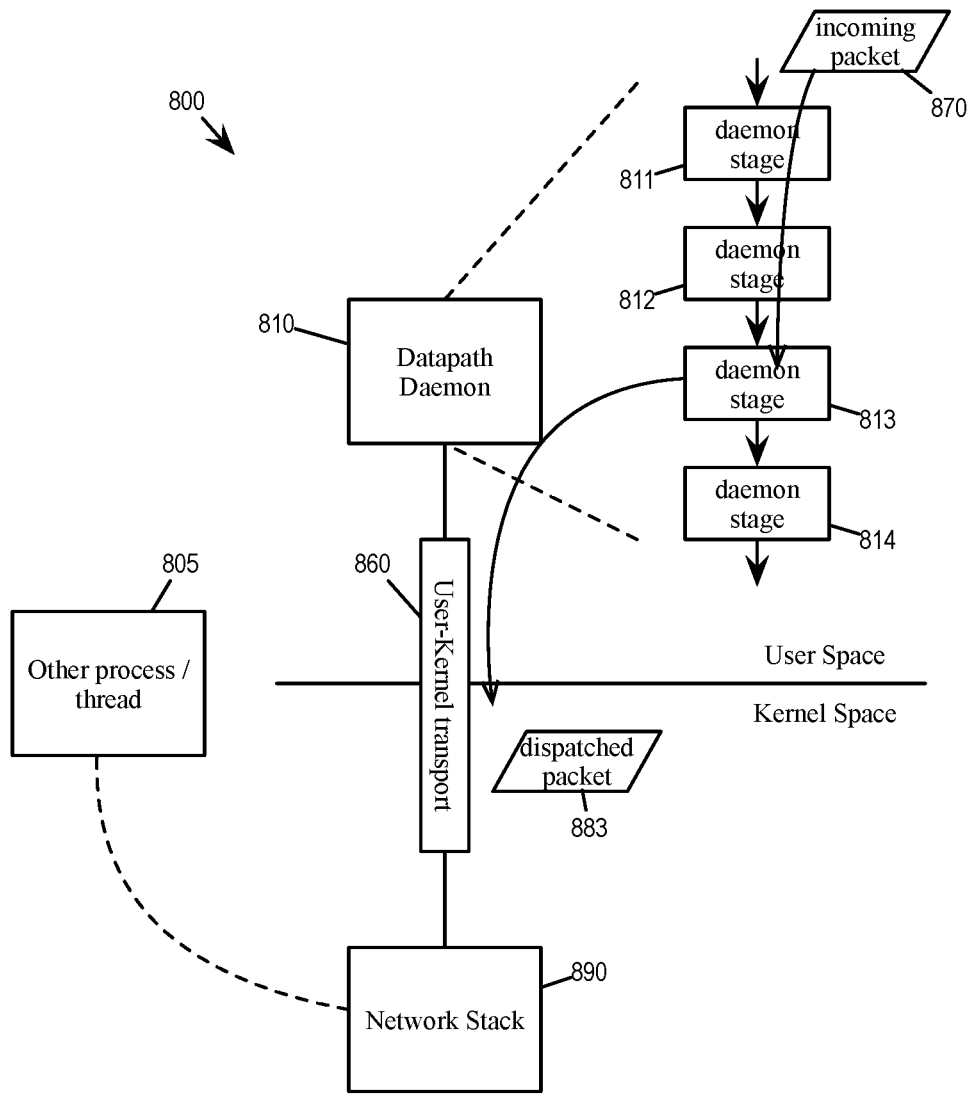
FIG. 8 illustrates a user space datapath daemon that communicates with a kernel network stack through a user-kernel transport and a network stack.

FIG. 8 illustrates a user space datapath daemon 800 that communicates with a kernel network stack 890 through a user-kernel transport 860 and a network stack 890. The data path daemon is 800 is performing several stages 811-814 for processing a packet 870. The user-kernel transport 860 receives a packet 883 dispatched from the stage 813 (i.e., when the datapath is performing the stage 813), and the dispatched packet 883 is delivered to the network stack 890. The network stack 890 is in the kernel space of the operating system. The kernel network stack 890 processes the dispatched packet 883 and makes it ready for consumption by other processes in the machine such as a user space process 805 that is external to the datapath daemon 810 (i.e., not part of the run-to-completion thread). In some embodiments, the user space process is in a namespace that the network stack 890 is able to deliver packet to. In some embodiments, the external process 805 is a control plane process that consumes the dispatched packet and does not return a result packet back to the datapath daemon as described above by reference to FIG. 7a-b. In some embodiments, the external process 805 is a data plane process that returns a resulting packet back to the datapath daemon 810 to continue processing as described above by reference to FIG. 6.

Figure 9:
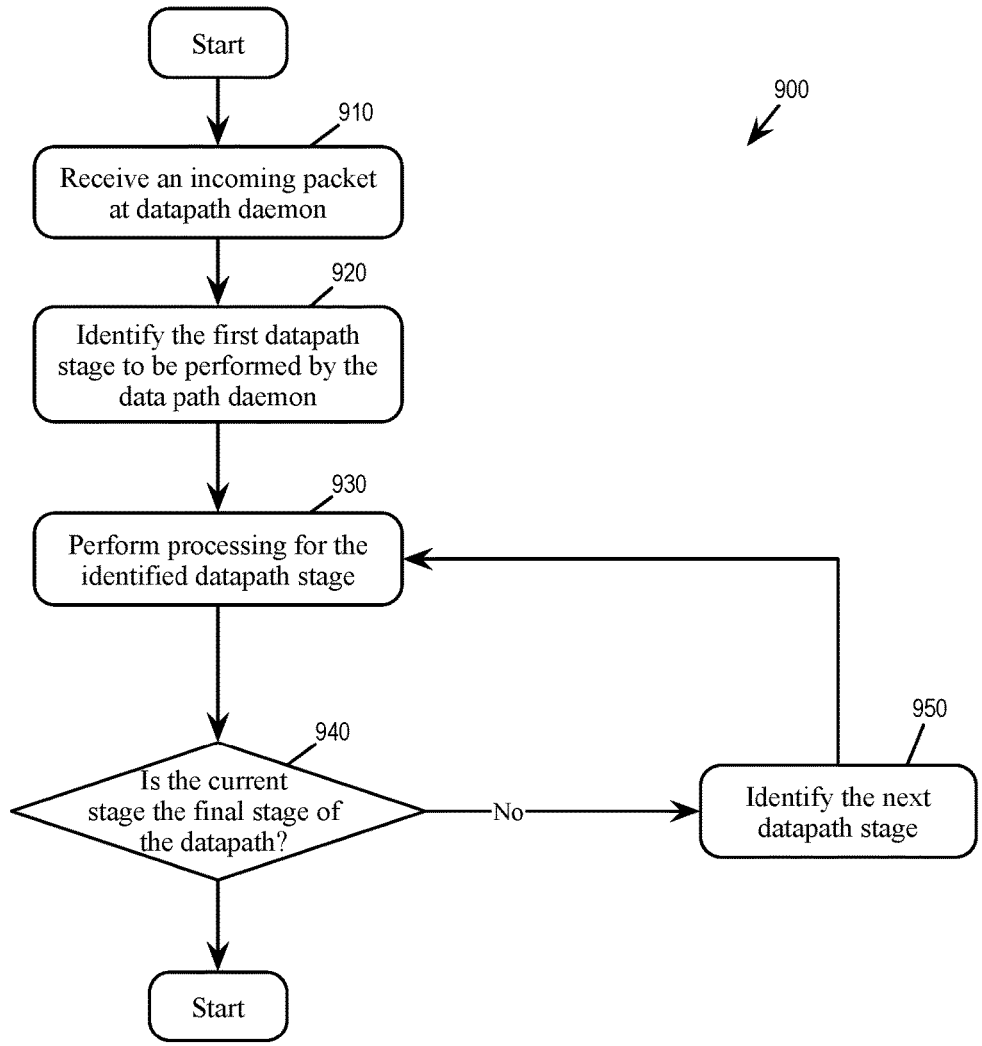
FIG. 9 conceptually illustrates a process for performing a gateway datapath.

FIG. 9 conceptually illustrates a process 900 for performing a gateway datapath. In some embodiments, the process performs the stages of a datapath at the datapath daemon while dispatching packets to a process or processing thread external to the datapath daemon. The process is performed by the processing unit(s) of the gateway machine in some embodiments. The process 900 starts when the gateway machine receives (at 910) an incoming packet from the network. This packet can be a northbound packet leaving the datacenter through the gateway for an external network (e.g., external physical network 190), or a southbound packet entering the logical networks of the datacenter through the gateway. In some embodiments, the gateway machine has a user space poll mode driver that polls the queues of the physical NIC for receiving the incoming packets.

The process then identifies (at 920) the first datapath stage to be performed by the datapath daemon. In some embodiments, the process identifies the next datapath stage based on the configuration data stored in the DP configuration database (i.e., 230) and the content of the incoming packet. The identification of a datapath pipeline stage is further described in in Section I above.

Next, the process performs (at 930) the packet processing of the identified datapath stage. In some embodiments, the datapath stage can be a stage that is performed entirely by the datapath daemon (i.e., part of the run-to-completion thread), such as the stages 611 and 612. In some embodiments, the datapath stage can be a dispatch stage (such as the stage 613) that dispatches packets to be processed by another process or daemon that is external to the datapath daemon (i.e., not part of the run-to-completion thread) through an inter-process transport (e.g., the inter-process transport 560 or the user-kernel transport 860). In some embodiments, the process dispatches a packet to an external process by redirecting the packet away from the datapath daemon, i.e., the packet flows to the other process rather than through the datapath daemon, and the datapath daemon stops processing the packet (at least until the external process returns a resulting packet to the datapath daemon). In some embodiments, the process dispatches a packet to an external process by mirroring or replicating a packet that flow through a specified logical port or logical entity to the external process. The operations of 930 are further described below by reference to the process 1000 of FIG. 10, the process 1300 of FIG. 13, the process 1700 of FIG. 17, the process 1800 of FIG. 18, the process 2400 of FIG. 24, and the process 2600 of FIG. 26.

The process then determines (940) whether the current datapath stage is the final stage of the datapath for this packet. If the current datapath stage is the last stage of the datapath, the process 900 ends. If the current datapath stage is not the last stage of the datapath, the process identifies (at 950) the next datapath stage to be performed (based on e.g., the DP configuration database) and returns to 930.

In some embodiments, the processed packet is a control plane packet that is handled by a control plane process rather than by the data plane. For such packets, the process 900 would end without producing any packets, because the control plane packet has already been transported to the corresponding control plane process through the inter-process transport. On the other hand, if the processed packet is a data plane packet, the process 900 would produce an output packet that is to be forwarded to a next hop machine when it ends.

Figure 10:
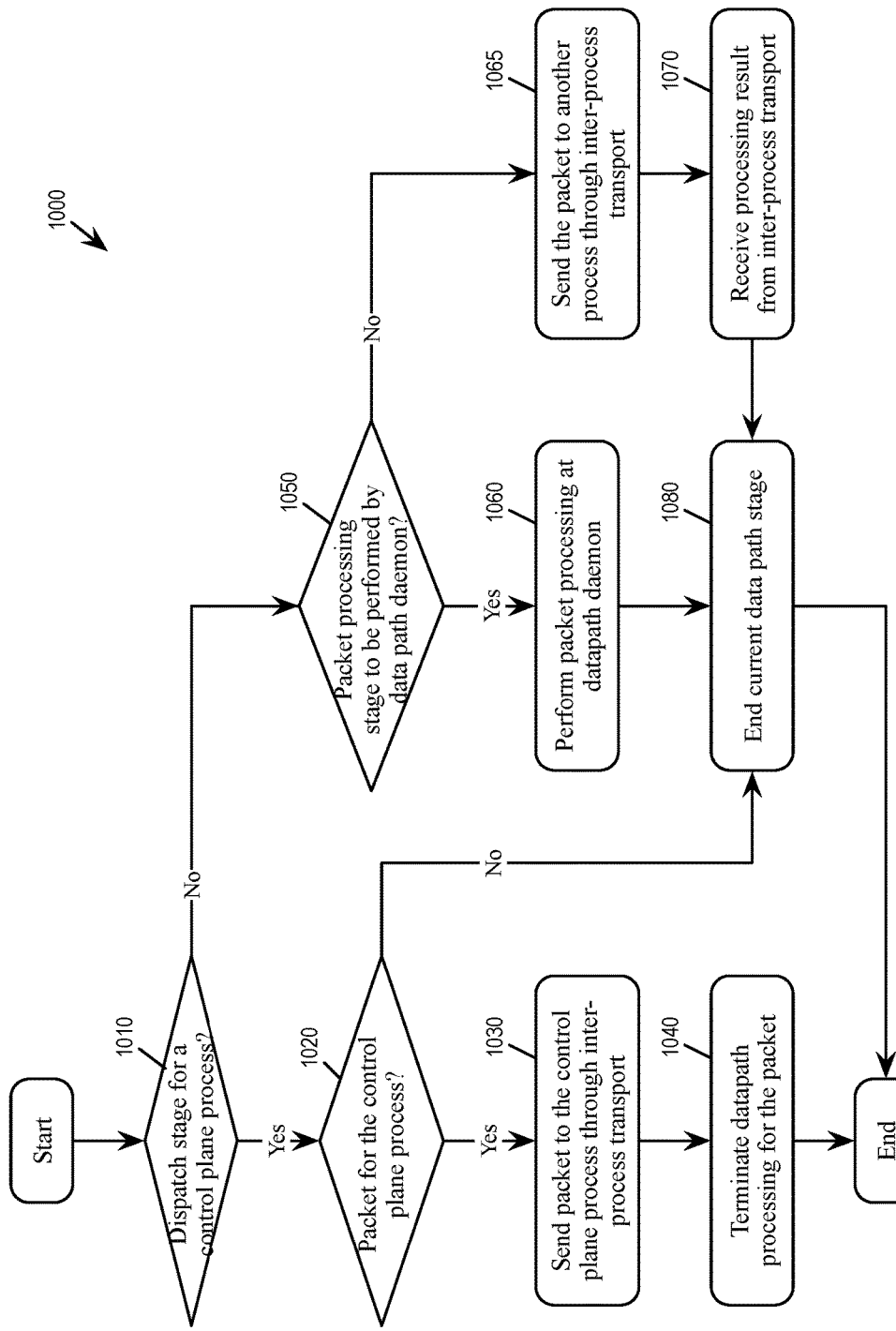
FIG. 10 conceptually illustrates a process for performing a datapath stage.

FIG. 10 conceptually illustrates a process 1000 for performing a datapath stage. Some embodiments perform the process 1000 when the gateway datapath process 900 performs the operation 930 to process an incoming packet.

The process 1000 starts by determining (at 1010) whether the datapath stage is a dispatch stage for a control plane process (e.g., 712), i.e., if this is a stage that examines whether the packet should be further handled by the datapath daemon. In some embodiments, the dispatch stage receives the incoming packet after it has already been processed by one or more previous datapath pipeline stages. If the stage is a dispatch stage for a control plane process, the process proceeds to 1020. Otherwise the process proceeds 1050.

At 1020, the process examines the packet for determining whether the incoming packet is a control plane packet of the control plane process targeted by the dispatch stage. For example, if the dispatch stage is for dispatching packets to a BGP control plane daemon, the process 1000 would determine whether the control plane packet is a BGP packet. If the packet is a control plane packet of the control plane process targeted by the dispatch stage, the process proceeds to 1030. If the packet is not a control plane packet of the control plane process targeted by the dispatch stage, e.g., if the packet is a data plane packet, or if the packet is a control plane packet that is not targeted by this dispatch stage, the process proceeds to 1080.

At 1030, the process sends the packet to the corresponding control plane process through the inter-process transport. In some embodiments, the control plane process requires the packet to first be processed by a network protocol stack. For some embodiments in which the network stack is a processing thread operating in the kernel space, the process 1000 would dispatch the packet to the network stack through a user-kernel transport (such as KNI or TUN/TAP). The process 1000 then proceeds to 1040 to terminate the datapath processing of the packet and ends.

At 1050, the process determines whether the packet processing stage is to be performed by the datapath daemon or is to be performed by a process or processing thread outside of the daemon. If the packet processing stage is to be performed by the datapath daemon, the process proceeds to 1060. If the packet processing stage is to be performed by an external process, the process proceeds to 1065. In some embodiments, whether a stage is to be performed by the daemon or by an external process is determined by the configuration data in DP configuration database, or alternatively by the programming of the datapath daemon.

At 1060, the process performs packet processing of the datapath stage at the datapath daemon, i.e., as part of the run-to-completion thread. Upon completion of the processing stage, the process then proceeds to 1080.

At 1065, the process has determined that the datapath stage is to be performed by an external data plane process. The process 1000 then sends the packet to the external data plane process through an inter-process transport. In some embodiments, the external data plane process requires the packet to first be processed by a network protocol stack. For some embodiments in which the network stack is a processing thread operating in the kernel space, the process 1000 dispatches the packet to the network stack through a user-kernel transport (such as KNI or TUN/TAP). The process then receives (1070) the resulting processed packet from the external data plane process. In some embodiments, this resulting processed packet is received from an inter-process transport by using the kernel network stack. The process then proceeds to 1080.

At 1080, the process completes the processing of the current datapath stage and ends. Upon completion of the process 1000, some embodiments proceeds to the next stage of the datapath pipeline at the datapath daemon, or alternatively ends the datapath daemon processing of the packet if the current stage is the last stage in the datapath pipeline.

III. Mirroring Packets to Network Stack

As mentioned, in some embodiments, the operating system of the gateway machine provides a network protocol stack as a processing thread in its kernel space. Such a network stack is normally used to handle network protocols for packets at a NIC of the gateway machine. Rather than implementing another network protocol stack in the user space, some embodiments leverages the existing kernel network stack to perform various operations. Some embodiments mirrors or copies packets flowing through various points of the datapath and send the mirrored packets to a kernel network stack through user-kernel transport (such as KNI), which is treated as a NIC by the kernel network stack. Once the packet reaches the kernel network stack, the gateway machine is able to utilize the functionalities of the kernel stack as if the datapath packet is directly provided by the physical NIC.

A. Network Traffic Dump

In some embodiments, the kernel network stack of the operating system of the gateway machine provide packet dump out capabilities. For example, for some embodiments that use the Linux operating system, the kernel network stack supports "tcpdump" operation, which is a packet analyzer that runs under the command line. It allows the user to display TCP/IP and other packets being transmitted or received over a network to which the computer is attached. In some embodiments, the datapath daemon mirrors packet to the network stack of the gateway would be able to use tcpdump command to view packets flowing through various logical entities or logical ports of the datapath. In some embodiments, the DP configuration database of the datapath daemon specifies which logical ports or which logical entities should the packets be mirrored to the kernel network stack. These packets are in turn available for analysis by tools such as "tcpdump".

Figure 11:
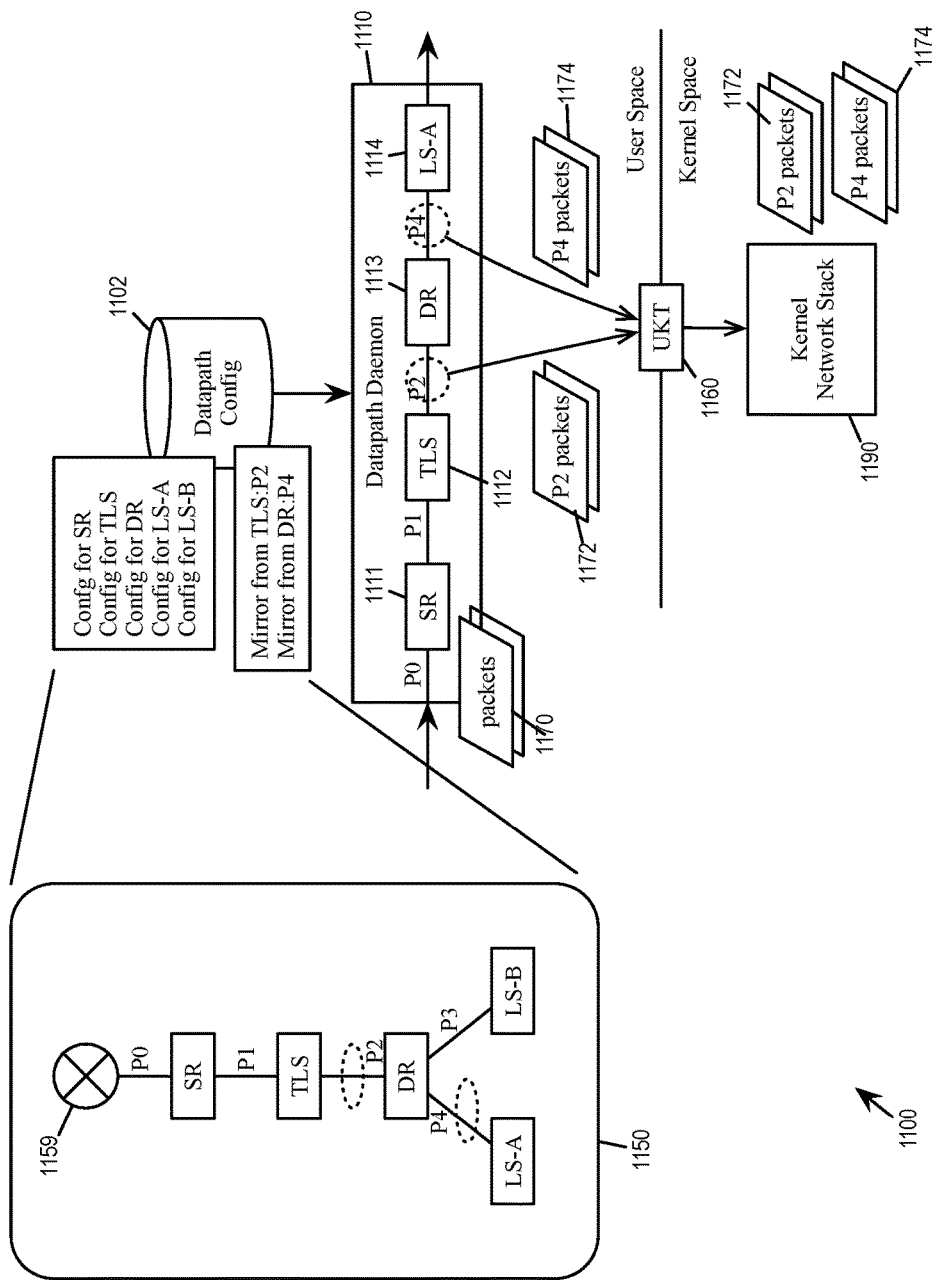
FIG. 11 conceptually illustrates a gateway machine that sends packets from specified operational points of a user space datapath to the kernel network stack.

FIG. 11 conceptually illustrates a gateway machine 1100 that sends packets at specified points of observation along the datapath to the kernel network stack. As illustrated, the gateway machine 1100 is operating a datapath daemon 1110 in its user space and a network stack 1190 in its kernel space. The user datapath daemon and the kernel network stack are able to communicate packets through a user-kernel transport 1160.

The gateway 1100 provides the northbound interface between a logical network 1150 and an external network through a physical router 1159. The logical network includes various logical entities: SR (service router), TLS (transit logical switch), DR (distributed router), LS-A (logical switch for L2 segment A), and LS-B (logical switch for L2 segment B). The SR is connected with an external physical router through an uplink "P0". The SR is also connected with the TLS through logical port "P1", the TLS is connected with DR through a logical port "P2". DR is connected with LS-A through logical port "P4" and LS-B through logical port "P3". The datapath daemon 1110 is processing an incoming packet 1170, for which the datapath daemon invokes datapath stages 1111-1114 that correspond to logical entities SR, TLS, DR, and L S-A of the logical network 1150.

The operations of the datapath daemon are configured by a DP configuration database 1102, which stores the configuration data for the various datapath pipeline stages (configuration data for SR, TLS, DR, LS-A, and LS-B). The DP configuration database 1102 also stores specifications for packet mirroring. Specifically, the configuration specifies that packets reaching logical port "P2" and "P4" are to be mirrored, and the mirrored packets are to be transported to the kernel network stack through the user-kernel transport 1160. In this example, packets 1172 reaching logical port "P2" are outputs of the TLS stage 1112 and inputs of the DR stage 1113, and packets 1174 reaching logical ports "P4" are outputs of the DR stage 1113 and inputs of the LS-A stage 1114. The datapath daemon sends these mirror packets 1172 and 1174 to the kernel network stack 1190 through the user-kernel transport 1160.

Figure 12:
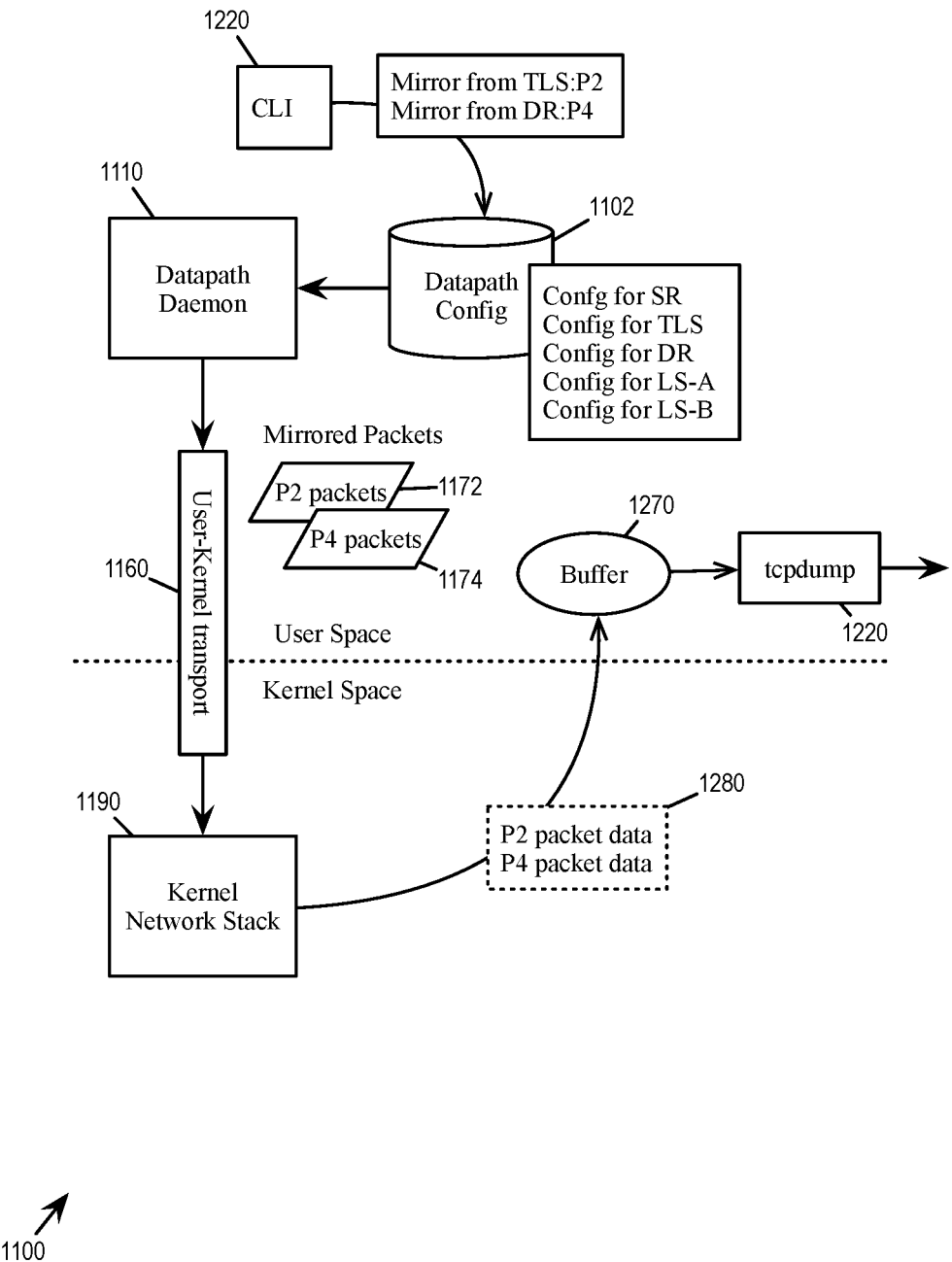
FIG. 12 illustrates using tcpdump and kernel network space to analyze the packet traffic of a gateway's datapath.

FIG. 12 illustrates using tcpdump and kernel network space 1190 to analyze the packet traffic of the gateway's datapath (as implemented by the datapath daemon 1110). As mentioned, in some embodiments, the DP configuration database of the datapath daemon includes specification of the observational points to mirror packets from. In some embodiments, these specifications are provided by a user interface, which can be a command line interface (CLI) or a graphical user interface (GUI). As illustrated, a CLI 1220 specifies that packets at the logical ports "P2" and "P4" are to be mirrored. As a result, the packets 1172 and 1174 are mirrored to the kernel network stack 1190.

Once the mirrored packets 1172 and 1174 reach the kernel network stack, they are made available for dump out/analysis by tools such as "tcpdump" of Linux. In some embodiments, the kernel network stack copies the mirrored packets to a user space buffer 1270 to be consumed by a tcpdump program 1280. In some embodiments, the "tcpdump" program 1280 is a user space program for reporting (e.g., printing out) the content of network packets; it can read packets from a NIC or from a previously created saved packet file. In some embodiments, a user can use a same user interface (e.g., CLI 1220) to specify the points of observation/packet mirroring and to invoke the "tcpdump" command.

Figure 13:
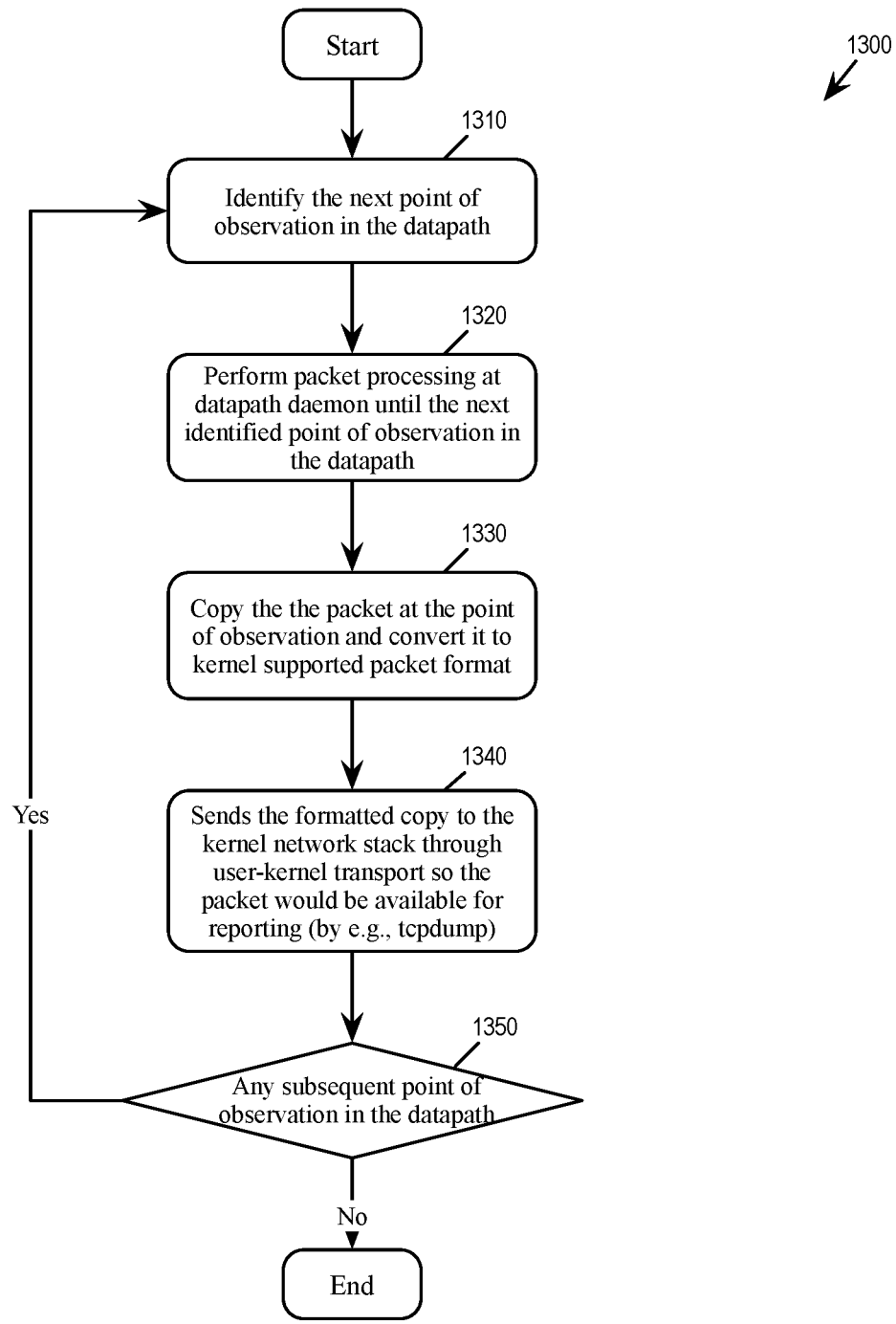
FIG. 13 conceptually illustrates a process for using kernel network stack to perform packet traffic analysis of the datapath daemon in user space.

FIG. 13 conceptually illustrates a process 1300 for using kernel network stack to perform packet traffic analysis of the datapath daemon in user space. Some embodiments perform the process 1300 when it performs the operation 930 of the process 900.

The process 1300 starts when the datapath daemon receives a packet and starts performing datapath processing. The process then identifies (at 1310) a point of observation in the datapath. In some embodiments, the DP configuration database (e.g., 230) of the datapath daemon includes the specification of the points of observation along the datapath. As mentioned, these points of observation can be a logical entity (logical router, logical switch, etc.) or a logical port of a logical entity along the datapath. In the example of FIG. 11, the logical ports P2 and P4 are the points of observation.

Next, the process performs (at 1320) packet processing at datapath daemon until the next identified point of observation. In some embodiments, the datapath daemon executes the stages of the datapath pipeline according to the content of the packet (i.e., by parsing the packet) until reaching a logical port or a logical entity that is an identified point of observation.

The process then copies (at 1330) the packet at the point of observation and converts the packet according to a kernel-supported format. In some embodiments, this is the packet at the output of the last datapath stage before the point of observation. The process then sends (at 1340) the formatted copy of the packet to the kernel network stack through user-kernel transport so the packet would be available for reporting (by e.g., tcpdump). The operations of 1330 and 1340 are also referred to as packet-mirroring as one copy of the packet remain with the datapath daemon for processing while another copy is sent to the kernel network stack for monitoring purposes.

Next, the process determines (at 1350) if there is any subsequent point of observation in the datapath. If this is the last point of observation along the datapath, the process 1300 ends. Otherwise, the process returns 1310 to mirror the packet from the next point of observation. In some embodiments, after the end of the process 1300, the datapath daemon continues processing the packet until the end of the datapath pipeline.

B. Control Plane Traffic

Some embodiments dispatch packets from the datapath daemon to other user space processes. In some embodiments, these user space processes are for processing control plane packets of the network such as BGP packets. These packets are not to be forwarded in the data plane, but are instead used by control plane processes such as configuring routing tables.

As mentioned above by reference to FIGS. 7a-b, datapath daemon in some embodiments forwards these control plane packets to their corresponding control plane processes by packet dispatching from the datapath daemon. Specifically, the packets are dispatched to the network stack from the datapath daemon through user-kernel transport, and the network stack in turn forwards the packet to its corresponding control plane process. In some embodiments, a control plane packet (such as BGP packet) has identifiers that are recognizable by the network stack so the network stack can deliver the packet to the corresponding control plane user process.

In some embodiments, the control plane process is regarded as being performed by a logical entity in the logical network, specifically in the service router. In some embodiments, the datapath has a dispatch stage that corresponds to the control plane process. In some embodiments, such a stage is for determining whether the packet is for the control plane process or not. For example, in some embodiments, the datapath's service router includes a BGP dispatch stage for determining whether the incoming packet is a BGP packet. If so, the datapath daemon terminates processing of the packet (i.e., bypassing subsequent datapath stages) and let the BGP process consumes the BGP packet and performs the corresponding BGP operations.

Figure 14A:
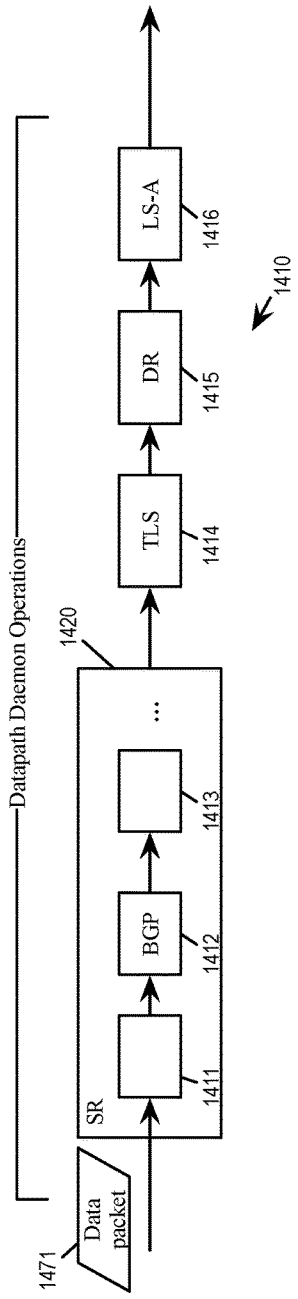
FIGS. 14a-b illustrates a datapath daemon that forwards BGP packets to a BGP daemon that is external to the datapath.
Figure 14B:
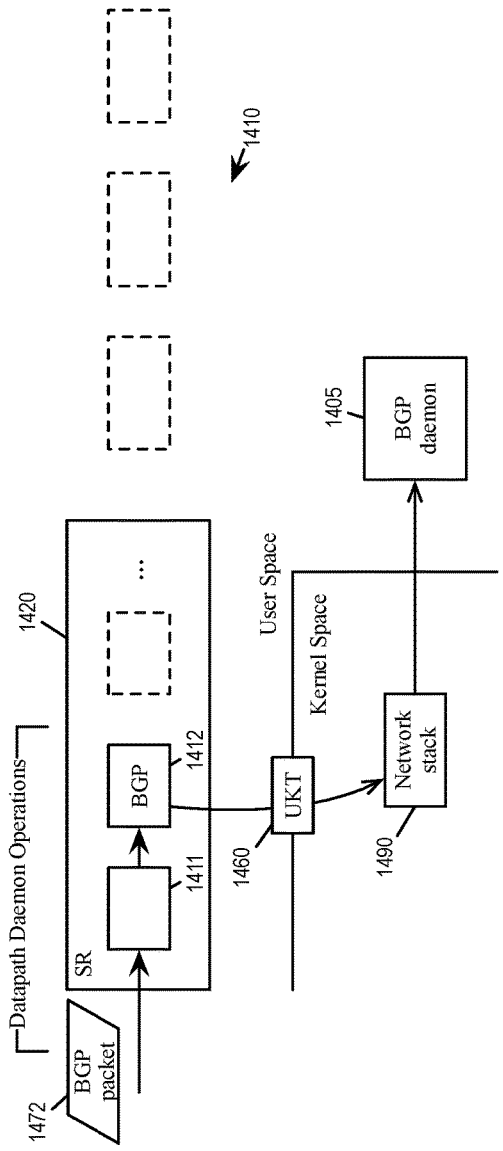

FIGS. 14a-b illustrates a datapath daemon 1410 that forwards BGP packets to a BGP daemon 1405 that is external to the datapath. FIG. 14a illustrates the datapath daemon processing a data plane packet 1471. For processing the packet 1471, the datapath daemon executes several pipeline stages 1411-1416. Among these, the stage 1412 is a BGP stage. The BGP stage 1412 does not perform BGP control plane operations, but it is a dispatch stage during which the datapath daemon examines the incoming packet to determine whether it is a BGP packet. In the example of FIG. 14a, the packet 1471 is a data plane packet that is destined for the L2 segment of logical switch A (LS-A). The datapath daemon therefore does not stop at the BGP stage 1412 but instead continues to execute all the way through to stage 1416, which correspond to LS-A.

FIG. 14b illustrates the datapath daemon 1410 processing a BGP packet 1472. For processing the packet 1472, the datapath daemon 1410 excutes an initial pipeline stage 1411 and then the BGP stage 1412. Since the packet 1471 is a BGP packet, the datapath daemon stops executing and let the BGP daemon 1405 process the BGP packet in order to learn routes from an external router.

As illustrated, the datapath daemon 1410 dispatches the BGP packet to the BGP daemon through a user-kernel transport 1460 and a kernel network stack 1490. In some embodiments, this dispatching occurs when the datapath daemon 1410 is executing the BGP dispatch stage 1412. In some embodiments, the BGP stage 1412 is part of a service router stage 1420, and the datapath daemon dispatches all packets from the uplink and downlink interfaces of the service router 1420 to the kernel network stack 1490. The network stack in turn processes the dispatched packets and delivers any BGP packets to the BGP daemon 1405.

Figure 15:
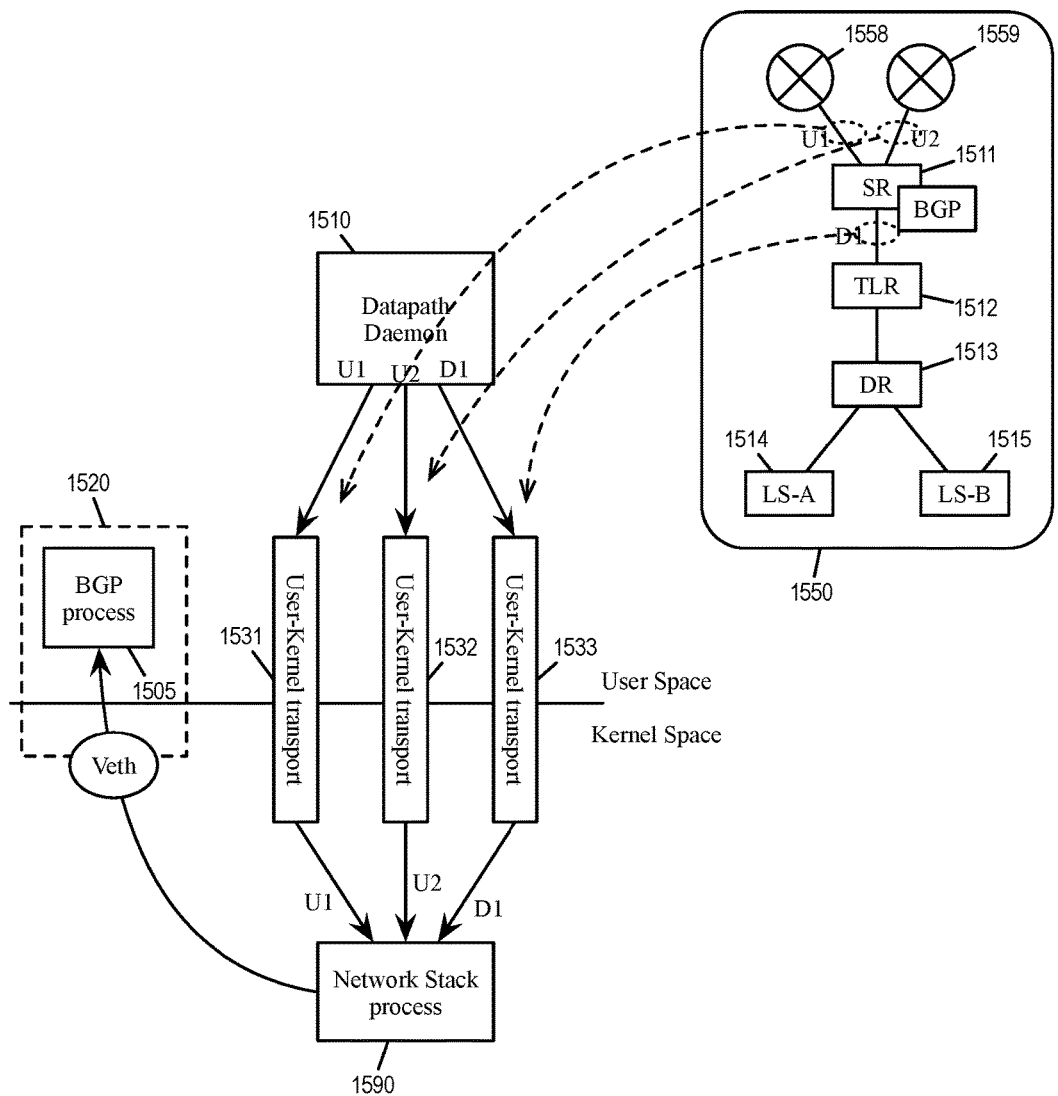
FIG. 15 illustrates the mirroring of packets from a datapath daemon to a BGP daemon.

FIG. 15 illustrates the dispatching of packets from a datapath daemon to a BGP daemon. As illustrated, a gateway 1500 is executing a datapath daemon 1510 while dispatching BGP control plane packets to a control plane process 1505. The BGP control plane process 1505 is external to the datapath daemon, and the dispatched packets are forwarded to the BGP control plane process 1505 (BGP daemon) by a kernel space network stack 1590. The BGP packets have identifiers that are recognizable by the network stack 1590 so the network stack can deliver them to the BGP daemon 1505. As illustrated, the BGP daemon 1505 is within its own namespace 1520, and the network stack delivers the BGP packets to the BGP process through the virtual interfaces (e.g, Veth0 or Veth1) of the name space 1520.

The datapath stages of the daemon 1510 correspond to logical entities of a logical network 1550, which includes a service router (SR) 1511, a transit logical router (TLR) 1512, a distributed router (DR) 1513, a logical switch for L2 segment A (LS-A) 1514, and a logical switch for L2 segment B (LS-B) 1515. The service router 1511 has two uplinks U1 and U2 for connecting to external physical routers 1558 and 1559 as well as a downlink D1 for connecting to the TLR 1512.

Logically, the service router 1511 supports BGP exchange, though the datapath daemon 1510 dispatches BGP packets to a BGP process 1505, which is performed outside of the datapath daemon 1510 as illustrated. For some embodiments in which control plane operations are (logically) handled by the service router, each of service router's interfaces is assigned a user-kernel transport for dispatching packets to the network stack 1590. In the example of FIG. 15, the service router 1511 has three interfaces that correspond to the uplink U1, the uplink U2, and the downlink D1. The datapath daemon 1510 has at least three user-kernel transports 1531-1532 for dispatching packets from these three interfaces to the kernel network stack 1590, and therefrom to the BGP process 1505 in user space. In some embodiments each uplink of the service router gathers its own set of the BGP routing information from its own corresponding external physical router (1558 for U1 and 1559 for U2) so the BGP process 1505 would be able to identify BGP routing information from different physical routers.

Figure 16:
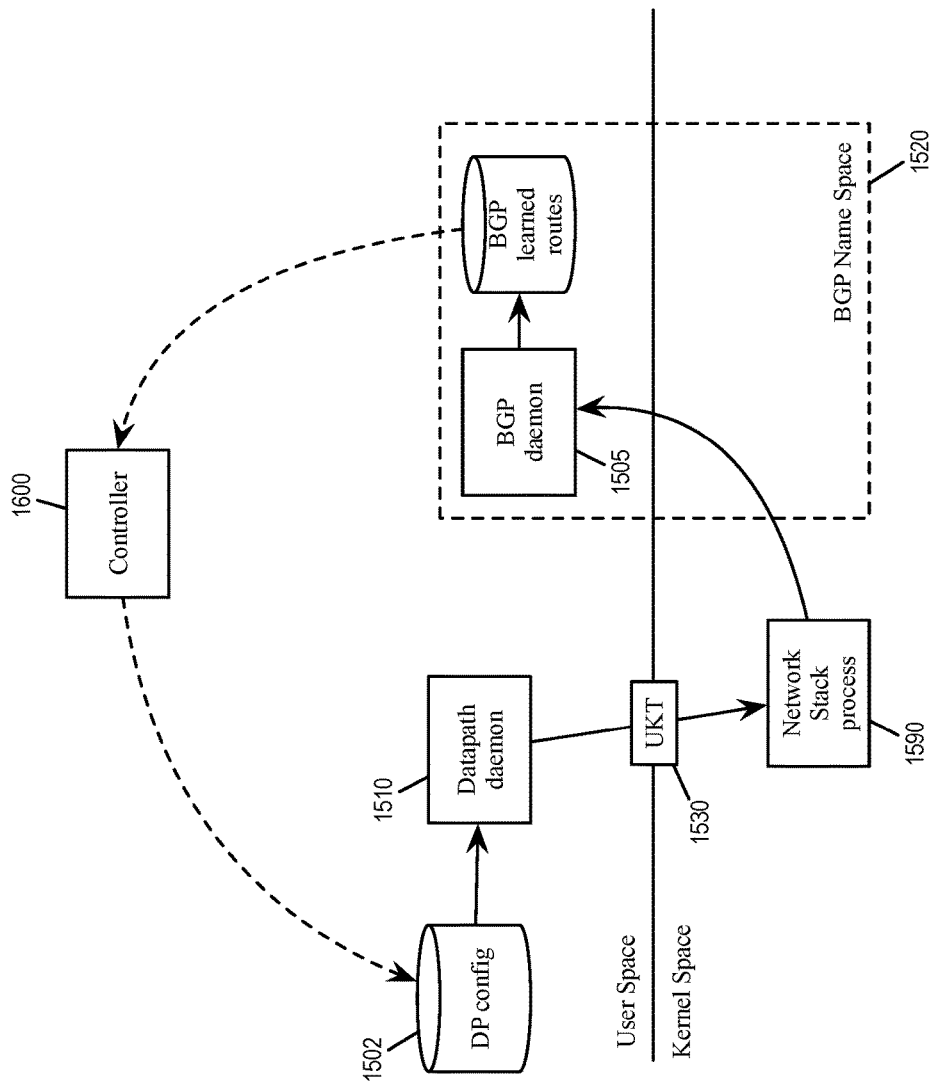
FIG. 16 illustrates the configuring of a datapath daemon by BGP routes learned by BGP control plane processes external to the dataphat daemon.

In some embodiments, BGP routing information gathered by the BGP process is used to program the routing tables and forwarding tables of the datapath daemon. FIG. 16 illustrates the configuring of a datapath daemon by BGP routes learned by BGP control plane processes external to the datapath daemon. The figure illustrates a network controller 1600 that fetches the routes learned by the BGP process 1505 and configures the datapath daemon 1510 by programming the learned routes into the DP configuration database 1502. The learned BGP routes are gathered from the BGP packets delivered to the BGP namespace 1520 by the kernel network stack 1590, which receives the BGP packets from the datapath daemon 1510 through the user-kernel transports 1530.

Figure 17:
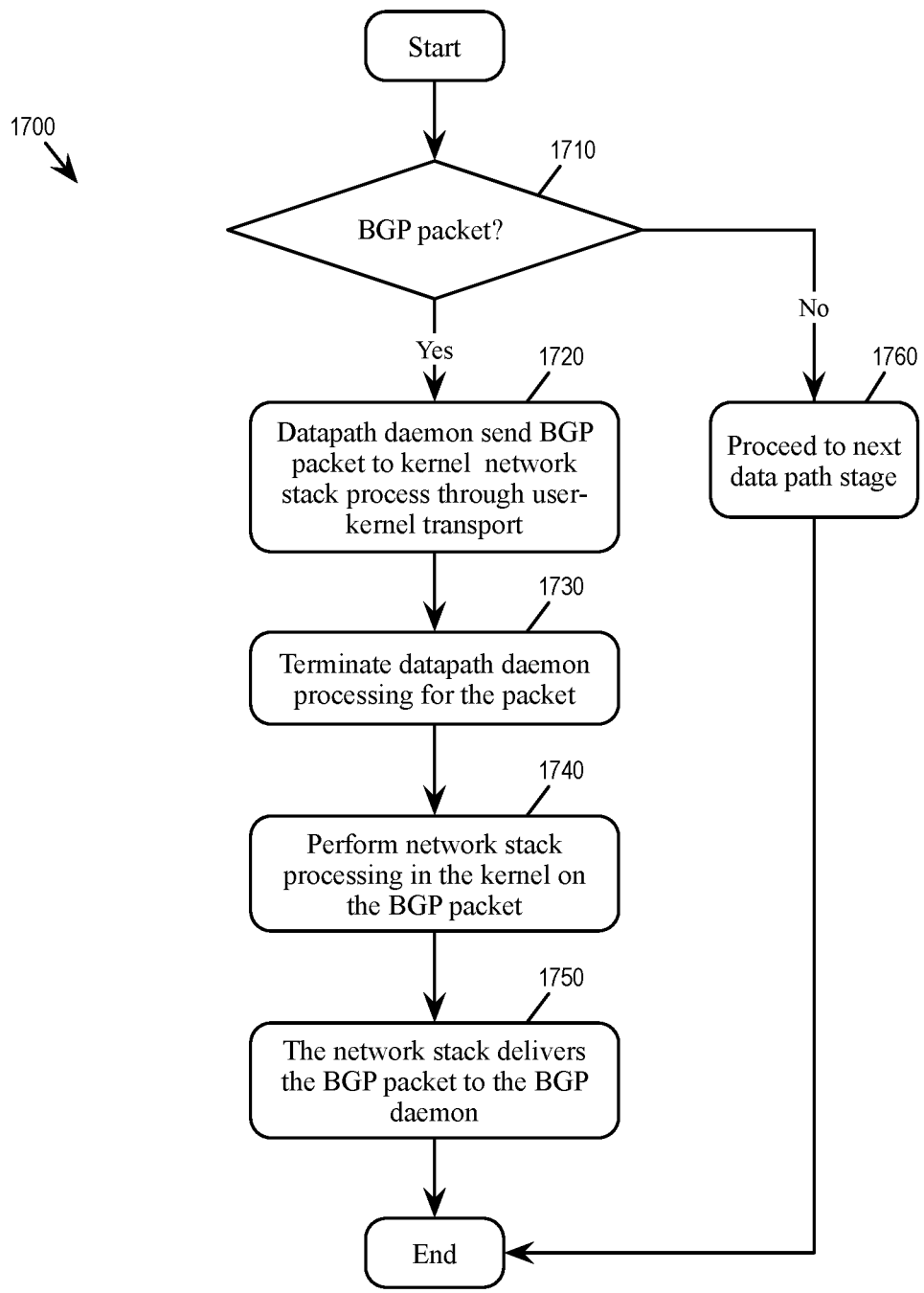
FIG. 17 conceptually illustrates a process by which the datapath daemon sends control plane packet to an external control plane process.

FIG. 17 conceptually illustrates a process 1700 by which the datapath daemon sends control plane packet to an external control plane process. The description of the process uses BGP as example, but one of ordinary skill would understand the process 1700 is a general process that is applicable to other types of control plane traffic as well. In some embodiments, the gateway machine performs the process 1700 by using one or more processing threads in user space and in kernel space. Some embodiments perform the process 1700 when the gateway datapath process 900 performs the operation 930 to process an incoming packet.

The process 1700 starts when the datapath daemon receives a packet and has performed certain preliminary processing on the packet. For some embodiments in which the datapath daemon includes a dispatch stage for a particular control plane process (e.g., the BGP stage 1412 performed by the datapath daemon 1410), the process starts when the packet has reached the dispatch stage for the control plane process.

The process determines at 1710 whether the packet is a BGP packet, i.e., if the packet is a control plane packet of the type that corresponds to the control plane stage in the datapath. In some embodiments, this determination is made based upon identifiers available within the packet, such as transport protocol, IP addresses, etc. If the packet is not a BGP packet (e.g., a data plane packet or a control plane packet that is not a BGP packet), the process proceeds to 1760 for the datapath daemon to execute the next processing stage. If the packet is a BGP packet, the process proceeds to 1720.

At 1720, the process sends the BGP packet from the datapath daemon to the kernel network stack through a user-kernel transport (e.g., the transports 1531-1533). The process then terminates (at 1730) datapath processing of the incoming packet at the datapath daemon since the packet is not a data plane packet.

Next, the process performs (at 1740) network stack processing on the BGP packet, based on which the kernel network stack delivers (at 1750) the BGP packet to the BGP control plane process. In some embodiments, the BGP control plane process is a BGP daemon that operates within a BGP namespace, and the namespace has virtual interfaces that receive packets from the kernel network stack. The process 1700 then ends.

IV. Software Architecture

Figure 18:
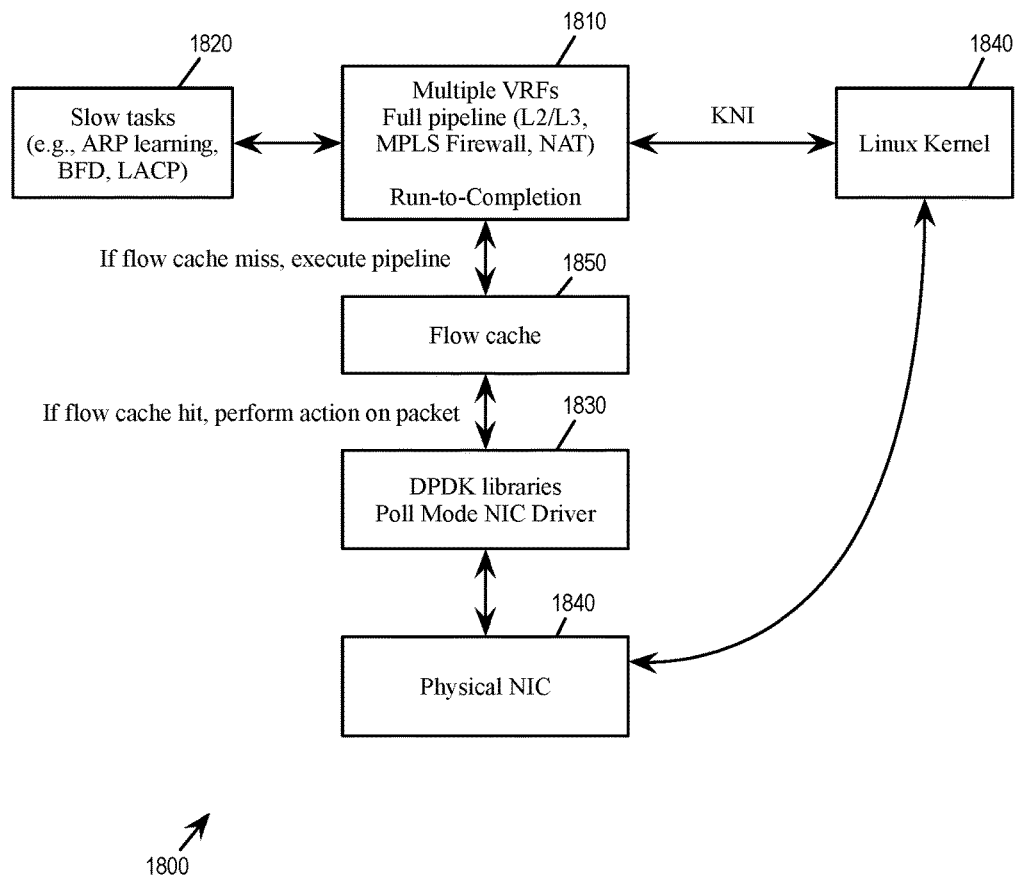
FIG. 18 illustrates the architecture of a gateway machine according to some embodiments of the invention.

FIG. 18 illustrates the architecture of a gateway machine 1800 according to some embodiments of the invention. The memory usage of the gateway machine is divided into user space and kernel space. The kernel space is reserved for running a privileged operating system kernel, kernel extensions, and most device drivers. User space is the memory area where application software and some drivers execute.

As illustrated, the packet processing threads 1810 (i.e., the datapath daemon) is operating in the user space for handling L2 switching, L3 routing, and services such as Firewall, NAT. Other service tasks such as ARP (address resolution request) learning, BFD (bidirectional forwarding detection) are considered slower running and therefore handled by separate processes 1820 in the user space. These slower tasks are not handled by the datapath daemon. The packet processing threads 1810 relies on a set of DPDK libraries 1830 (Data Plane Development Kit® by Intel®) for receive packets from a NIC 1840. In some embodiments, the datapath daemon relies on a user space NIC driver that uses poll mode to receive packets from the NIC 1840. Some embodiments implement a flow cache 1850 for the datapath daemon. The flow cache 1850 would produce an immediate datapath processing result if the incoming packet is a cache hit while letting the datapath daemon execute if the incoming packet is a cache miss.

In the kernel space, an operating system kernel 1840 (e.g., Linux) operates TCP/IP stacks and dispatches packets from the NIC 1840 as well as packets from the datapath daemon 1810. Some embodiments use KNI (kernel NIC Interface) to transport data between user space and the kernel space, such as between the datapath daemon 1810 and the kernel network stack 1840.

As mentioned, the gateway machine in some embodiments is implemented by using a processor having multiple cores, and that each datapath daemon performs all of its pipeline stages in a RTC (run-to-completion) thread at one core. In some embodiments, a datapath daemon may insert a service pipeline stage that is performed by service processes performed by another thread at another core.

Figure 19A:
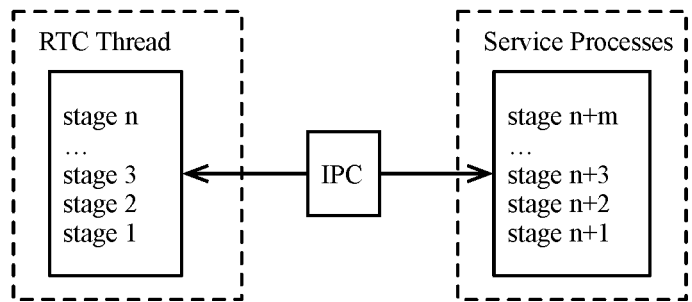
FIG. 19a conceptually illustrates a RTC thread using IPC to communicate with service processes in order to provide services.

In some embodiments, these service processes communicate with the RTC threads using some form of inter-process communications (IPC) such as shared memory or socket. A RTC thread receives packets from NICs, performs the regular L2/L3 forwarding, and classifies packet to determine if a packet requires a service. When a packet requires a service, the packet is sent to the corresponding service process via IPC channel. The IPC service process dequeues and processes the packets. After processing a packet, the service process pass it back to the RTC threads, which continues processing the packet (and may send the packet to another service process for other services.) Effectively, the RTC threads are used to provide basic forwarding and steer packets between service processes. FIG. 19a conceptually illustrates a RTC thread using IPC to communicate with service processes in order to provide services.

In some other embodiments, a service process runs within a container and does not use IPC to communicate with the RTC thread and is in fact unaware of the RTC threads. The process opens standard TCP/UDP socket to send and receive packets from Linux kernel. Instead of using IPC to communicate between service process and RTC threads, tun/tap devices or KNI devices are created within the container. Routing table for the container is properly populated so that packets sent by service process can be routed using the proper tun/tap/KNI devices.

Figure 19B:
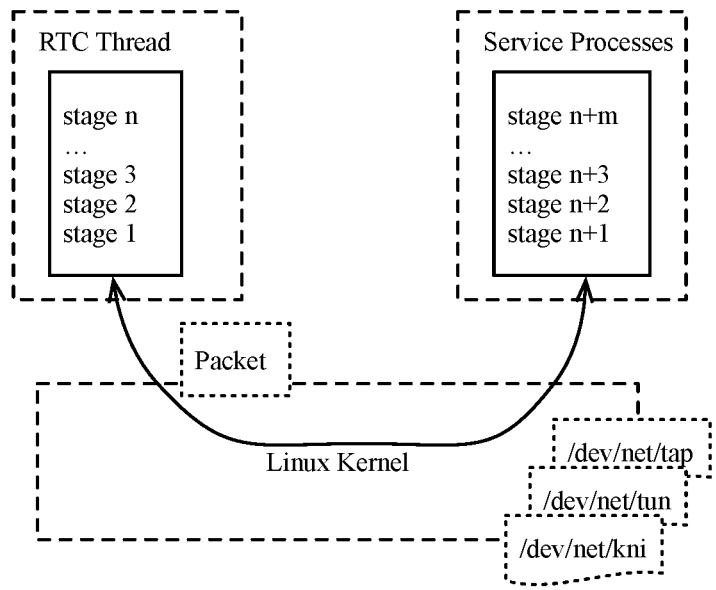
FIG. 19b conceptually illustrates a RTC thread using Linux Kernel to communicate with service processes in order to provide services.

When a RTC thread decides that a packet needs a service, it sends the packet to Linux kernel. After receiving the packet, Linux kernel processes it as if it is received from a NIC. Eventually the packet is delivered to the service process. When the service process finishes processing the packet, it sends the packet to the socket. The packet will be routed by Linux kernel towards one of the tun/tap/KNI devices and will be received by the RTC thread. FIG. 19b conceptually illustrates a RTC thread using Linux Kernel to communicate with service processes in order to provide services.

V. Computing Device & Virtualization Software

Figure 20:
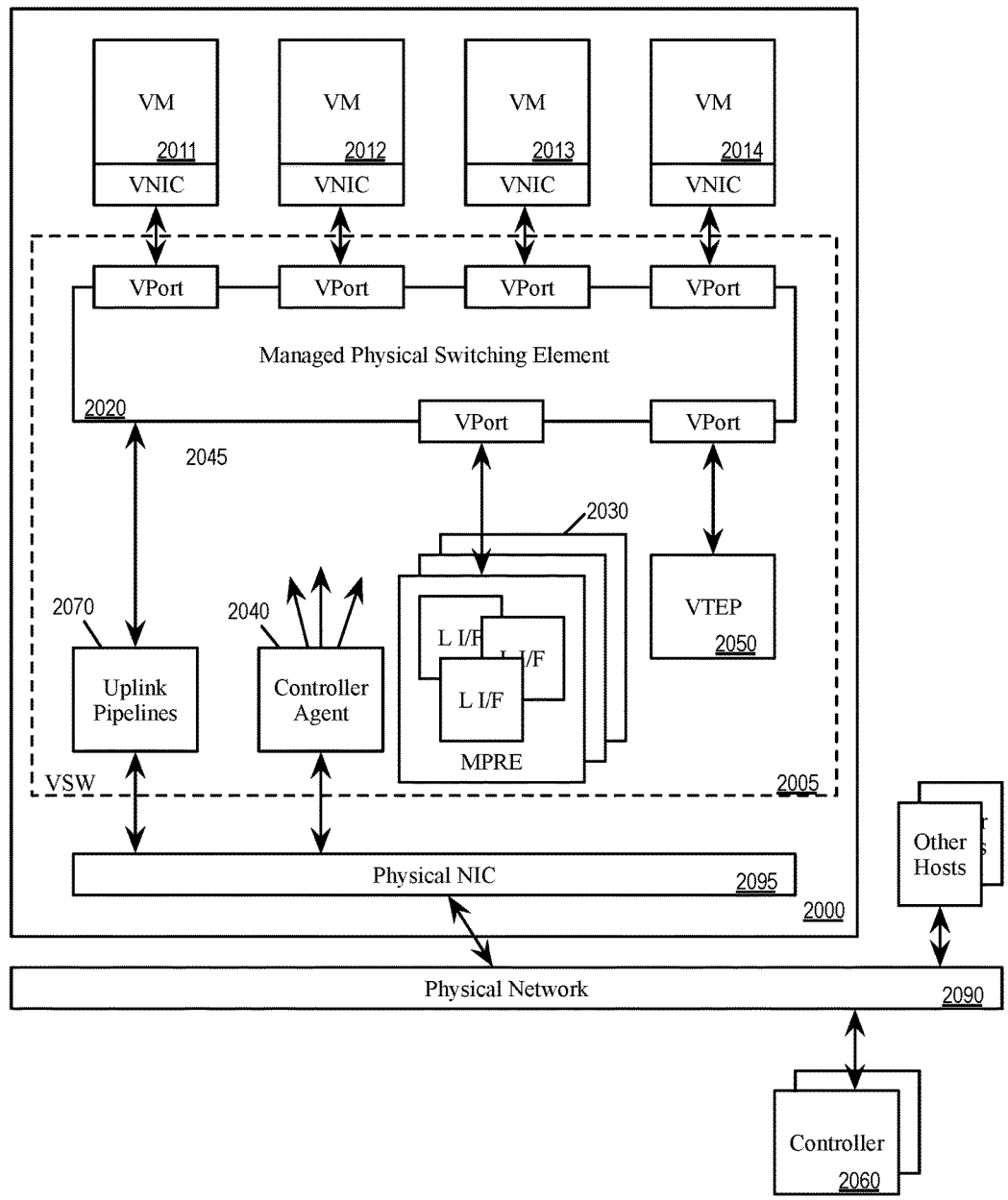
FIG. 20 illustrates a computing device that serves as a host machine that runs virtualization software for some embodiments of the invention.

Virtualization software, also known as managed forwarding element (MFE) or hypervisors, allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 20 illustrates a computing device 2000 that serves as a host machine or a gateway machine that runs virtualization software for some embodiments of the invention.

As illustrated, the computing device 2000 has access to a physical network 2090 through a physical NIC (PNIC) 2095. The host machine 2000 also runs the virtualization software 2005 and hosts VMs 2011-2014. The virtualization software 2005 serves as the interface between the hosted VMs and the physical NIC 2095 (as well as other physical resources, such as processors and memory). Each of the VMs includes a virtual NIC (VNIC) for accessing the network through the virtualization software 2005. Each VNIC in a VM is responsible for exchanging packets between the VM and the virtualization software 2005. In some embodiments, the VNICs are software abstractions of physical NICs implemented by virtual NIC emulators.

The virtualization software 2005 manages the operations of the VMs 2011-2014, and includes several components for managing the access of the VMs to the physical network (by implementing the logical networks to which the VMs connect, in some embodiments). As illustrated, the virtualization software includes several components, including a MPSE 2020, a set of MPREs 2030, a controller agent 2040, a VTEP 2050, and a set of uplink pipelines 2070.

The VTEP (VXLAN tunnel endpoint) 2050 allows the host machine 2000 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 2000 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 2070.

The controller agent 2040 receives control plane messages from a controller or a cluster of controllers. In some embodiments, these control plane message includes configuration data for configuring the various components of the virtualization software (such as the MPSE 2020 and the MPREs 2030) and/or the virtual machines. In the example illustrated in FIG. 20, the controller agent 2040 receives control plane messages from the controller cluster 2060 from the physical network 2090 and in turn provides the received configuration data to the MPREs 2030 through a control channel without going through the MPSE 2020. However, in some embodiments, the controller agent 2040 receives control plane messages from a direct data conduit (not illustrated) independent of the physical network 2090. In some other embodiments, the controller agent receives control plane messages from the MPSE 2020 and forwards configuration data to the router 2030 through the MPSE 2020.

The MPSE 2020 delivers network data to and from the physical NIC 2095, which interfaces the physical network 2090. The MPSE also includes a number of virtual ports (vPorts) that communicatively interconnects the physical NIC with the VMs 2011-2014, the MPREs 2030 and the controller agent 2040. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 2090 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 2030 perform L3 routing on data packets received from a virtual port on the MPSE 2020. In some embodiments, this routing operation entails resolving L3 IP address to a next-hop L2 MAC address and a next-hop VNI (i.e., the VNI of the next-hop's L2 segment). Each routed data packet is then sent back to the MPSE 2020 to be forwarded to its destination according to the resolved L2 MAC address. This destination can be another VM connected to a virtual port on the MPSE 2020, or a reachable L2 network element on the physical network 2090 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 2030 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 2070 relays data between the MPSE 2020 and the physical NIC 2095. The uplink module 2070 includes an egress chain and an ingress chain that each performs a number of operations. Some of these operations are pre-processing and/or post-processing operations for the MPRE 2030. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 20, the virtualization software 2005 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 2020, and hence a same L2 MAC address (vMAC or pMAC). In some other embodiments, each different MPRE belonging to a different tenant has its own port to the MPSE.

The MPSE 2020 and the MPRE 2030 make it possible for data packets to be forwarded amongst VMs 2011-2014 without being sent through the external physical network 2090 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 2000 (and its virtualization software 2005) is able to direct packets of different logical networks to their correct destinations and effectively segregates traffic of different logical networks from each other.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
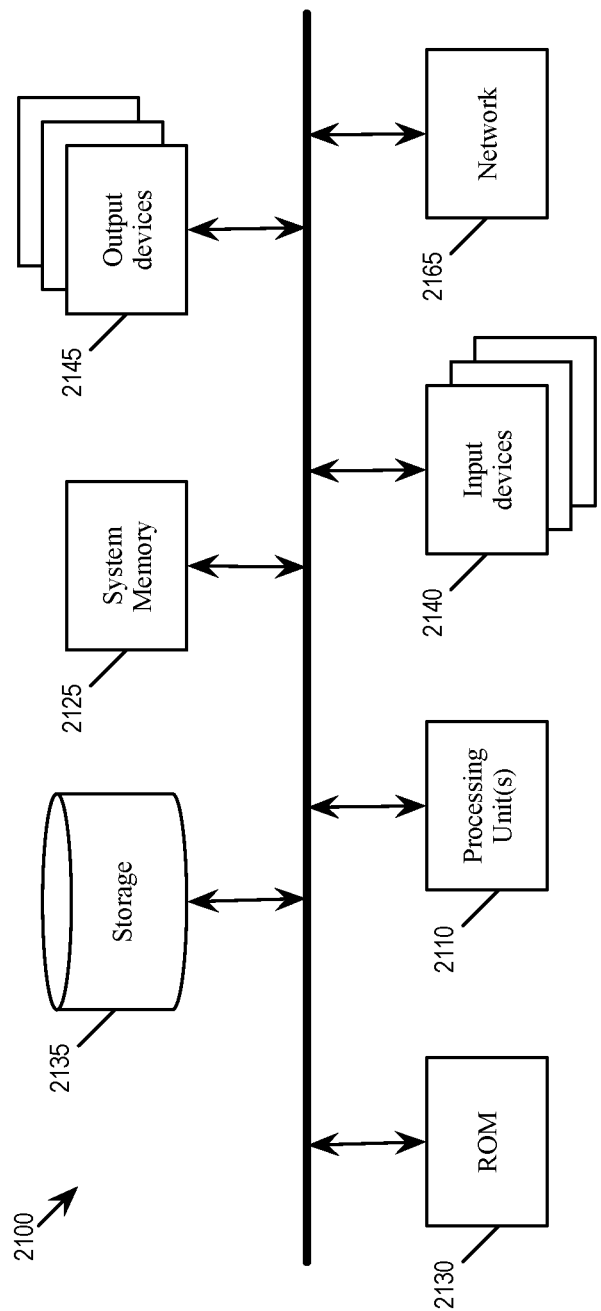
FIG. 21 conceptually illustrates an electronic system with which some embodiments of the invention are implemented.

FIG. 21 conceptually illustrates an electronic system 2100 with which some embodiments of the invention are implemented. The electronic system 2100 can be used to execute any of the control, virtualization, or operating system applications described above. The electronic system 2100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieves instructions to execute and data to process in order to execute the processes of the invention. The processing unit(s) may be a single processor or a multi-core processor in different embodiments.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieves instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 10, 13, 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for implementing a gateway datapath for a logical network, wherein the logical network comprises a plurality of logical forwarding elements connected by logical ports, the method comprising:
   receiving a packet at the gateway datapath, the gateway datapath executing in a user space of a computing device to process packets through sets of pipeline stages corresponding to the logical forwarding elements;
   executing a set of the pipeline stages to process the received packet through a set of the logical forwarding elements and logical ports; and
   replicating a copy of the packet to a kernel network stack by transporting the packet copy from the user space to the kernel space through a user-kernel transport upon processing the packet through a particular one of the pipeline stages identified by the gateway datapath as an observation point for the logical network, wherein the kernel network stack enables a process executing in the user space of the computing device to access the packet copy.

2. The method of claim 1, wherein the set of pipeline stages is executed as a run-to-completion thread of the gateway datapath.

3. The method of claim 1, wherein the sets of pipeline stages operate according to configuration data provided by a configuration database, wherein the configuration database further specifies the observation point.

4. The method of claim 1, wherein the logical forwarding elements of the logical network comprise distributed logical routers, logical switches, and service routers.

5. The method of claim 1, wherein the observation point identified by the gateway datapath is a logical port of a logical forwarding element that is identified by the particular pipeline stage.

6. The method of claim 1, wherein the observation point identified by the gateway datapath is a logical forwarding element to which the particular pipeline stage corresponds.

7. The method of claim 1, wherein the process executing in the user space that accesses the packet copy from the kernel network stack is for producing a report of packet traffic through the gateway datapath.

8. The method of claim 7, wherein the process is a packet dump command provided by the operating system.

9. A non-transitory machine readable medium storing a program that when executed by at least one processing unit of a computing device implements a gateway datapath for a logical network, the program comprising sets of instructions for:
   receiving a packet at the gateway datapath, the gateway datapath executing in a user space of the computing device to process packets through sets of pipeline stages corresponding to the logical forwarding elements;
   executing a set of the pipeline stages to process the received packet through a set of the logical forwarding elements and logical ports; and
   replicating a copy of the packet to a kernel network stack by transporting the packet copy from the user space to the kernel space through a user-kernel transport upon processing the packet through a particular one of the pipeline stages identified by the gateway datapath as an observation point for the logical network, wherein the kernel network stack enables a process executing in the user space of the computing device to access the packet copy.

10. The non-transitory machine readable medium of claim 9, wherein the set of pipeline stages is executed as a run-to-completion thread of the gateway datapath.

11. The non-transitory machine readable medium of claim 9, wherein the sets of pipeline stages operate according to configuration data provided by a configuration database, wherein the configuration database further specifies the observation point.

12. The non-transitory machine readable medium of claim 9, wherein the logical forwarding elements of the logical network comprise distributed logical routers, logical switches, and service routers.

13. The non-transitory machine readable medium of claim 9, wherein the observation point identified by the gateway datapath is a logical port of a logical forwarding element that is identified by the particular pipeline stage.

14. The non-transitory machine readable medium of claim 9, wherein the observation point identified by the gateway datapath is a logical forwarding element to which the pipeline stage corresponds.

15. The non-transitory machine readable medium of claim 9, wherein the process executing in the user space that accesses the packet copy from the kernel network stack is for producing a report of packet traffic through the gateway datapath.

16. The non-transitory machine readable medium of claim 15, wherein the process is a packet dump command provided by the operating system.

17. The method of claim 1, wherein the kernel network stack treats the packet copy as though received from a network interface controller of the computing device.

18. The method of claim 1, wherein the kernel network stack enables the process executing in the user space to access the packet copy by storing the packet copy in a user space buffer consumed by the process.

* * * * *